US 9,363,745 B2

(12) United States Patent
Balasubramanian et al.

(10) Patent No.: US 9,363,745 B2
(45) Date of Patent: Jun. 7, 2016

(54) DEVICE MANAGED ACCESS POINT LISTS IN WIRELESS COMMUNICATIONS

(76) Inventors: Srinivasan Balasubramanian, San Diego, CA (US); Manoj M. Deshpande, San Diego, CA (US); Young C. Yoon, San Diego, CA (US); Gavin B. Horn, La Jolla, CA (US)

(*) Notice: Subject to any disclaimer, the term of this patent is extended or adjusted under 35 U.S.C. 154(b) by 788 days.

(21) Appl. No.: 12/407,714

(22) Filed: Mar. 19, 2009

(65) Prior Publication Data
US 2009/0245176 A1    Oct. 1, 2009

Related U.S. Application Data

(60) Provisional application No. 61/039,728, filed on Mar. 26, 2008, provisional application No. 61/102,325, filed on Oct. 2, 2008.

(51) Int. Cl.
*H04W 88/08* (2009.01)
*H04W 48/20* (2009.01)
*H04W 8/18* (2009.01)
*H04W 48/08* (2009.01)
*H04W 48/16* (2009.01)

(52) U.S. Cl.
CPC ............. *H04W 48/20* (2013.01); *H04W 8/183* (2013.01); *H04W 48/08* (2013.01); *H04W 48/16* (2013.01)

(58) Field of Classification Search
None
See application file for complete search history.

(56) References Cited

U.S. PATENT DOCUMENTS

| 5,444,764 | A  | 8/1995 | Galecki |
| 6,950,660 | B1 | 9/2005 | Hsu et al. |
| 7,003,297 | B2 | 2/2006 | Willars et al. |
| 7,062,271 | B2 | 6/2006 | Choi |
| 7,483,702 | B2 | 1/2009 | Yeo et al. |
| 7,701,872 | B2 | 4/2010 | Islam et al. |
| 2004/0081086 | A1 | 4/2004 | Hippelainen et al. |
| 2004/0157600 | A1 | 8/2004 | Stumpert et al. |
| 2004/0192306 | A1 | 9/2004 | Elkarat et al. |
| 2004/0192313 | A1 | 9/2004 | Otting |

(Continued)

FOREIGN PATENT DOCUMENTS

| CN | 101044783 A | 9/2007 |
| DE | 19708189 A1 | 9/1998 |

(Continued)

OTHER PUBLICATIONS

International Search Report & Written Opinion—PCT/US2009/038454, International Search Authority—European Patent Office—Oct. 21, 2009.

(Continued)

*Primary Examiner* — Chi H Pham
*Assistant Examiner* — Soon-Dong D Hyun
(74) *Attorney, Agent, or Firm* — Ashish L. Patel

(57) ABSTRACT

Systems and methodologies are described that facilitate device-side access point list management. Blacklists of access points unsuitable for providing network access to a related mobile device can be maintained as well as whitelists of suitable access points. The lists can be managed using an interface provided at the mobile device. In addition, lists can be modified according to provisioned network updates. Also, the lists can be of maximum size such that older entries can be purged upon insertion of newer entries based on a number of factors; timed entry deletion is provided as well. Access points in the lists can be stored and presented according to various identifiers related to the access points.

89 Claims, 19 Drawing Sheets

(56) References Cited

U.S. PATENT DOCUMENTS

| | | |
|---|---|---|
| 2004/0203863 A1 | 10/2004 | Huomo |
| 2004/0235420 A1 | 11/2004 | Miyazaki |
| 2004/0246915 A1 | 12/2004 | Watanabe |
| 2004/0264426 A1 | 12/2004 | Komatsuzaki et al. |
| 2005/0090259 A1 | 4/2005 | Jain et al. |
| 2005/0222913 A1* | 10/2005 | Eisenberg ................. 705/26 |
| 2005/0271021 A1 | 12/2005 | Alemany et al. |
| 2006/0104211 A1 | 5/2006 | Islam et al. |
| 2006/0168438 A1* | 7/2006 | Klein ................................ 713/1 |
| 2006/0194582 A1 | 8/2006 | Cooper |
| 2007/0140194 A1* | 6/2007 | Lee et al. ................. 370/338 |
| 2008/0049702 A1 | 2/2008 | Meylan et al. |
| 2009/0082020 A1* | 3/2009 | Ch'ng et al. ............. 455/435.3 |
| 2009/0129336 A1* | 5/2009 | Osborn ..................... 370/331 |
| 2009/0253432 A1* | 10/2009 | Willey et al. ............. 455/435.2 |
| 2009/0288152 A1* | 11/2009 | Huber et al. .................. 726/6 |
| 2010/0227611 A1* | 9/2010 | Schmidt et al. ............ 455/434 |
| 2011/0116442 A1* | 5/2011 | Caldwell ............... H04W 12/08 370/328 |

FOREIGN PATENT DOCUMENTS

| | | |
|---|---|---|
| EP | 1065904 A1 | 1/2001 |
| EP | 1463243 A2 | 9/2004 |
| EP | 1638357 A1 | 3/2006 |
| GB | 2352586 A | 1/2001 |
| GB | 2407003 | 4/2005 |
| GB | 2425439 A | 10/2006 |
| JP | 2003198571 A | 7/2003 |
| JP | 3461831 B2 | 10/2003 |
| JP | 2004336740 A | 11/2004 |
| JP | 2006505201 A | 2/2006 |
| JP | 2006280000 A | 10/2006 |
| JP | 2007508720 A | 4/2007 |
| KR | 100638693 B1 | 10/2006 |
| KR | 20070067229 A | 6/2007 |
| KR | 100792281 B1 | 1/2008 |
| RU | 2111615 C1 | 5/1998 |
| RU | 2158485 C1 | 10/2000 |
| RU | 2006117780 A | 11/2007 |
| TW | 200731821 | 8/2007 |
| WO | 9501695 A1 | 1/1995 |
| WO | 9531075 A1 | 11/1995 |
| WO | 02089339 A2 | 11/2002 |
| WO | 2004043098 A1 | 5/2004 |
| WO | 2005036836 A1 | 4/2005 |
| WO | 2005041612 | 5/2005 |
| WO | WO2006043131 A1 | 4/2006 |
| WO | 2006062338 A1 | 6/2006 |
| WO | 2006073591 A2 | 7/2006 |
| WO | WO2007040454 A2 | 4/2007 |
| WO | WO2007069816 A1 | 6/2007 |
| WO | 2007148911 A1 | 12/2007 |
| WO | 2008005770 A2 | 1/2008 |
| WO | 2008025003 | 2/2008 |
| WO | 2008030956 A2 | 3/2008 |
| WO | 2009102368 A1 | 8/2009 |
| WO | 2009120898 A2 | 10/2009 |

OTHER PUBLICATIONS

3GPP TSG GERAN#37 GP-080106, Telefon AB LM Ericsson Neighbour Cell Lists in GERAN for LTE cells.
Huawei: "Rel-8 UE idle mode mobility for HNB", 3GPP TSG RAN2 Meeting #61bis Shenzhen, China, Mar. 30-Apr. 4, 2008, R2-081660.
Motorola: "Need for Complete Whitelist", 3GPP TSG-RAN2#61bis Shenzhen, China, Mar. 20, 2008, R2-081804.
Taiwan Search Report—TW098109769—TIPO—Mar. 8, 2013.
"SAE: Synchronization of Allowed CSG List", ZTE Corporation, 3GPP TSG CT WG1 Meeting #51 C1-080013.
Vodafone, Telecom Italia : "Mobility Management Identifiers in EPS Entities",C1-071669,3GPP TSG CT WG1 Meeting #48,Aug. 24, 2007.
Taiwan Search Report—TW102111449—TIPO—Sep. 17, 2014.
Taiwan Search Report—TW102111450—TIPO—Aug. 11, 2014.
Taiwan Search Report—TW102111451—TIPO—Oct. 7, 2014.
Taiwan Search Report—TW102111454—TIPO—Oct. 17, 2014.
Taiwan Search Report—TW102111450—TIPO—Jul. 13, 2015.

* cited by examiner

DEVICE MANAGED ACCESS POINT LISTS IN WIRELESS COMMUNICATIONS

CLAIM OF PRIORITY UNDER 35 U.S.C. §119

The present Application for Patent claims priority to Provisional Application No. 61/039,728 entitled "SYSTEMS AND METHODS TO MANAGE MOBILE STATION LEARNED INFORMATION WITHIN A NETWORK" filed Mar. 26, 2008, and assigned to the assignee hereof and hereby expressly incorporated by reference herein, as well as Provisional Application No. 61/102,325 entitled "SYSTEMS AND METHODS TO ENABLE USER CONTROLLED ACCESS LISTS FOR BASE STATIONS" filed Oct. 2, 2008, and assigned to the assignee hereof and hereby expressly incorporated by reference herein.

BACKGROUND

1. Field

The following description relates generally to wireless communications, and more particularly to access point lists.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

As mobile devices initiate communications with a wireless network and/or move throughout service areas, the mobile devices can select and/or reselect cells utilized for communication between one or more access points providing the cells (e.g., macrocells, femtocells, etc.). The mobile devices can measure parameters related to one or more access points and/or related cells, such as signal quality, service level, etc. and rank according to desirability, which can be based on one or more of the parameters. Upon detecting an access point that offers an optimal signal or service as compared to a current access point or other neighboring access points, the mobile device can select or reselect the access point to receive wireless network access.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating maintaining lists of unsuitable and/or suitable access points, or related cells, at a mobile device. The lists can be utilized in selecting and/or reselecting access points for receiving wireless network access where unsuitable access points are not selected regardless of desirability of other communication parameters and suitable access points can be selected though other neighboring access points can have more desirable communication parameters. In one example, the lists can be maintained by the mobile device and updated using a provided interface, event detector, etc. In addition, however, the wireless network can provision operations on the list including adding/removing entries, flushing the lists, and/or the like, to the mobile device.

According to related aspects, a method is provided including maintaining an operator controlled list of identifiers related to access points in a wireless network. The method also includes maintaining a user controlled list of identifiers related to access points in the wireless network and utilizing the operator controlled list and the user controlled list in determining one or more access points for requesting access to the wireless network.

Another aspect relates to a wireless communications apparatus. The wireless communications apparatus can include at least one processor configured to manage an operator controlled list of identifiers related to access points in a wireless network. The at least one processor is further configured to manage a user controlled list of identifiers related to access points in the wireless network and determine one or more access points for requesting access to the wireless network based on the operator controlled list and/or the user controlled list. The wireless communications apparatus also comprises a memory coupled to the at least one processor.

Yet another aspect relates to an apparatus that includes means for maintaining an operator controlled list of identifiers related to access points in a wireless network and a user controlled list of identifiers related to access points in the wireless network. The apparatus can additionally include means for determining one or more access points for requesting access to the wireless network based on the operator controlled list and/or the user controlled list.

Still another aspect relates to a computer program product, which can have a computer-readable medium including code for causing at least one computer to maintain an operator controlled list of identifiers related to access points in a wireless network. The computer-readable medium can also comprise code for causing the at least one computer to maintain a user controlled list of identifiers related to access points in the wireless network. Moreover, the computer-readable medium can comprise code for causing the at least one computer to utilize the operator controlled list and the user controlled list in determining one or more access points for requesting access to the wireless network.

Moreover, an additional aspect relates to an apparatus. The apparatus can include a list maintainer that manages an operator controlled list of identifiers related to access points in a wireless network and a user controlled list of identifiers related to access points in the wireless network. The apparatus further includes an access point evaluator that utilizes the operator controlled list and/or the user controlled list in selecting an access point from which to request access to the wireless network.

According to another aspect, a method is provided including maintaining a blacklist of identifiers related to unsuitable access points for providing access to a wireless network. The method also includes modifying the blacklist according to a command received from the wireless network and utilizing the blacklist in determining one or more access points for requesting access to the wireless network.

Another aspect relates to a wireless communications apparatus. The wireless communications apparatus can include at least one processor configured to manage a blacklist of access points unsuitable for providing wireless network access to the wireless communications apparatus and update at least one blacklist access point entry based at least in part on a network command related to a determined modification in an operating parameter for the blacklist access point entry. The at least one processor is further configured to request network access to an access point based at least in part on verifying absence of the access point in the blacklist. The wireless communications apparatus also comprises a memory coupled to the at least one processor.

Yet another aspect relates to an apparatus that includes means for maintaining a blacklist of access points unsuitable for providing access to a wireless network and means for modifying the blacklist according to an update command received from the wireless network. The apparatus can additionally include means for analyzing the blacklist in requesting wireless network access from one or more access points.

Still another aspect relates to a computer program product, which can have a computer-readable medium including code for causing at least one computer to maintain a blacklist of identifiers related to unsuitable access points for providing access to a wireless network. The computer-readable medium can also comprise code for causing the at least one computer to modify the blacklist according to a command received from the wireless network. Moreover, the computer-readable medium can comprise code for causing the at least one computer to utilize the blacklist in determining one or more access points for requesting access to the wireless network.

Moreover, an additional aspect relates to an apparatus. The apparatus can include a list maintainer that manages a blacklist of access points unsuitable for providing access to a wireless network and a network command analyzer that processes one or more commands, received from the wireless network, to update the blacklist. The apparatus further includes an access point evaluator that utilizes the blacklist in selecting an access point from which to request access to the wireless network.

According to another aspect, a method is provided including determining modification of an operating parameter related to one or more access points. The method also includes transmitting a command to update a local blacklist to one or more mobile devices based on the operating parameter modification.

Another aspect relates to a wireless communications apparatus. The wireless communications apparatus can include at least one processor configured to detect a modification to an operating parameter related to one or more access points and generate a network command to provision an update to a blacklist of access points unsuitable for providing network access. The at least one processor is further configured to transmit the network command to a mobile device. The wireless communications apparatus also comprises a memory coupled to the at least one processor.

Yet another aspect relates to an apparatus that includes means for receiving a parameter modification related to an access point in a wireless network. The apparatus can additionally include means for provisioning a network command to update a local blacklist to one or more mobile devices in the wireless network based on the parameter modification.

Still another aspect relates to a computer program product, which can have a computer-readable medium including code for causing at least one computer to determine modification of an operating parameter related to one or more access points. The computer-readable medium can also comprise code for causing the at least one computer to transmit a command to update a local blacklist to one or more mobile devices based on the operating parameter modification.

Moreover, an additional aspect relates to an apparatus. The apparatus can include a parameter change evaluator that determines a modified operating parameter related to one or more access points in a wireless network. The apparatus further includes a network command provisioner that transmits a list update command to one or more mobile devices based at least in part on the modified operating parameter.

According to another aspect, a method is provided including maintaining a blacklist of access points unsuitable for providing access to a wireless network based at least in part on one or more commands received from a provided user interface. The method also includes detecting an access point that provides access to the wireless network and scanning for one or more disparate access points based at least in part on identifying the access point in the blacklist.

Another aspect relates to a wireless communications apparatus. The wireless communications apparatus can include at least one processor configured to manage a blacklist of access points unsuitable for providing wireless network access to the wireless communications apparatus based at least in part on one or more requests received from a provided user interface. The at least one processor is further configured to detect an access point that provides access to the wireless network and analyze one or more disparate access points based at least in part on identifying the access point in the blacklist. The wireless communications apparatus also comprises a memory coupled to the at least one processor.

Yet another aspect relates to an apparatus that includes means for maintaining a blacklist of access points unsuitable for providing access to a wireless network. The apparatus can additionally include means for modifying the blacklist according to an update command received from a provided user interface and means for analyzing the blacklist in requesting wireless network access from one or more access points in the wireless network.

Still another aspect relates to a computer program product, which can have a computer-readable medium including code for causing at least one computer to maintain a blacklist of access points unsuitable for providing access to a wireless network based at least in part on one or more commands received from a provided user interface. The computer-readable medium can also comprise code for causing the at least one computer to detect an access point that provides access to the wireless network. Moreover, the computer-readable medium can comprise code for causing the at least one computer to scan for one or more disparate access points based at least in part on identifying the access point in the blacklist.

Moreover, an additional aspect relates to an apparatus. The apparatus can include an interface that receives one or more commands to update a blacklist of access points unsuitable for providing access to a wireless network. The apparatus further includes a list maintainer that manages the blacklist based at least in part on the one or more commands and an access point evaluator that utilizes the blacklist in selecting an access point from which to request access to the wireless network.

According to another aspect, a method is provided including maintaining a plurality lists of access point identifiers corresponding to a group of access points, which provide similar access to a wireless network and detecting an access point that advertises an identifier present in at least one of the lists. The method also includes determining whether to establish a connection with the access point based at least in part on presence of the identifier in the at least one list.

Another aspect relates to a wireless communications apparatus. The wireless communications apparatus can include at least one processor configured to manage a plurality of lists of access point identifiers, the identifiers are related to a group of access points that provide similar access to a wireless network and detect an access point that provides access to the wireless network and advertises an identifier present in at least one of the lists. The at least one processor is further configured to determine whether to establish communication with the access point based on presence of the identifier in the at least one list and a type of the at least one list. The wireless communications apparatus also comprises a memory coupled to the at least one processor.

Yet another aspect relates to an apparatus that includes means for maintaining a plurality of lists of access point identifiers, the identifiers are related to a group of access points that provide similar access to a wireless network and means for analyzing at least one of the lists to detect presence of an identifier of an access point. The apparatus can additionally include means for establishing communication with the access point based on analyzing the at least one list.

Still another aspect relates to a computer program product, which can have a computer-readable medium including code for causing at least one computer to maintain a plurality lists of access point identifiers corresponding to a group of access points, which provide similar access to a wireless network. The computer-readable medium can also comprise code for causing the at least one computer to detect an access point that advertises an identifier present in at least one of the lists. Moreover, the computer-readable medium can comprise code for causing the at least one computer to determine whether to establish a connection with the access point based at least in part on presence of the identifier in the at least one list.

Moreover, an additional aspect relates to an apparatus. The apparatus can include a list maintainer that manages a plurality of lists of access point identifiers, the identifiers correspond to groups of access points that provide similar access to a wireless network. The apparatus further includes an access point evaluator that detects an access point that advertises an identifier and establishes communication with the access point based at least in part on analyzing at least one of the lists to determine whether the identifier is present.

According to another aspect, a method is provided including maintaining one or more lists of access point communication parameters computed from signals received from the respective access points and computing an access point communication parameter from a signal received from the access point. The method also includes determining whether to establish a connection with the access point based at least in part on presence of the computed communication parameter in the at least one list.

Another aspect relates to a wireless communications apparatus. The wireless communications apparatus can include at least one processor configured to manage a list of access point communication parameters computed from one or more signals received from the respective access points. The at least one processor is further configured to determine a communication parameter related to an access point and determine whether to establish communication with the access point based on presence of the communication parameter in the list. The wireless communications apparatus also comprises a memory coupled to the at least one processor.

Yet another aspect relates to an apparatus that includes means for maintaining a list of access point communication parameters determined from one or more signals received from the access points. The apparatus can additionally include means for determining a communication parameter related to an access point and means for establishing communication with the access point based at least in part on determining whether the communication parameter is in the list.

Still another aspect relates to a computer program product, which can have a computer-readable medium including code for causing at least one computer to maintain one or more lists of access point communication parameters computed from signals received from the respective access points. The computer-readable medium can also comprise code for causing the at least one computer to compute an access point communication parameter from a signal received from the access point. Moreover, the computer-readable medium can comprise code for causing the at least one computer to determine whether to establish a connection with the access point based at least in part on presence of the computed communication parameter in the at least one list.

Moreover, an additional aspect relates to an apparatus. The apparatus can include a list maintainer that manages a list of access point communication parameters calculated from one or more signals received from related access points. The apparatus further includes an access point evaluator that determines an access point communication parameter and establishes communication with the access point based at least in part on analyzing the list to determine whether the communication parameter is present.

According to another aspect, a method is provided including maintaining a blacklist of access points unsuitable for providing access to a wireless network and determining a time duration during which an access point is present in the blacklist. The method also includes computing a deletion time for the access point from the blacklist based at least in part on the time duration.

Another aspect relates to a wireless communications apparatus. The wireless communications apparatus can include at least one processor configured to manage a blacklist of access points unsuitable for providing access to a wireless network. The at least one processor is further configured to discern a time duration related to presence of an access point in the blacklist and calculate a deletion time for the access point from the blacklist based at least in part on the time duration. The wireless communications apparatus also comprises a memory coupled to the at least one processor.

Yet another aspect relates to an apparatus that includes means for maintaining a blacklist of access points unsuitable for providing access to a wireless network and means for receiving a time duration during which the access point is present in the blacklist. The apparatus can additionally include means for determining a deletion time for the access point from the list based at least in part on the time duration.

Still another aspect relates to a computer program product, which can have a computer-readable medium including code for causing at least one computer to maintain a blacklist of access points unsuitable for providing access to a wireless network. The computer-readable medium can also comprise code for causing the at least one computer to determine a time duration during which an access point is present in the blacklist. Moreover, the computer-readable medium can comprise code for causing the at least one computer to compute a deletion time for the access point from the blacklist based at least in part on the time duration.

Moreover, an additional aspect relates to an apparatus. The apparatus can include a list maintainer that manages a blacklist of access points unsuitable for providing access to a wireless network. The apparatus further includes a list entry timer that computes a deletion time for an access point from the blacklist based at least in part on a determined time duration for which the access point has been in the blacklist.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
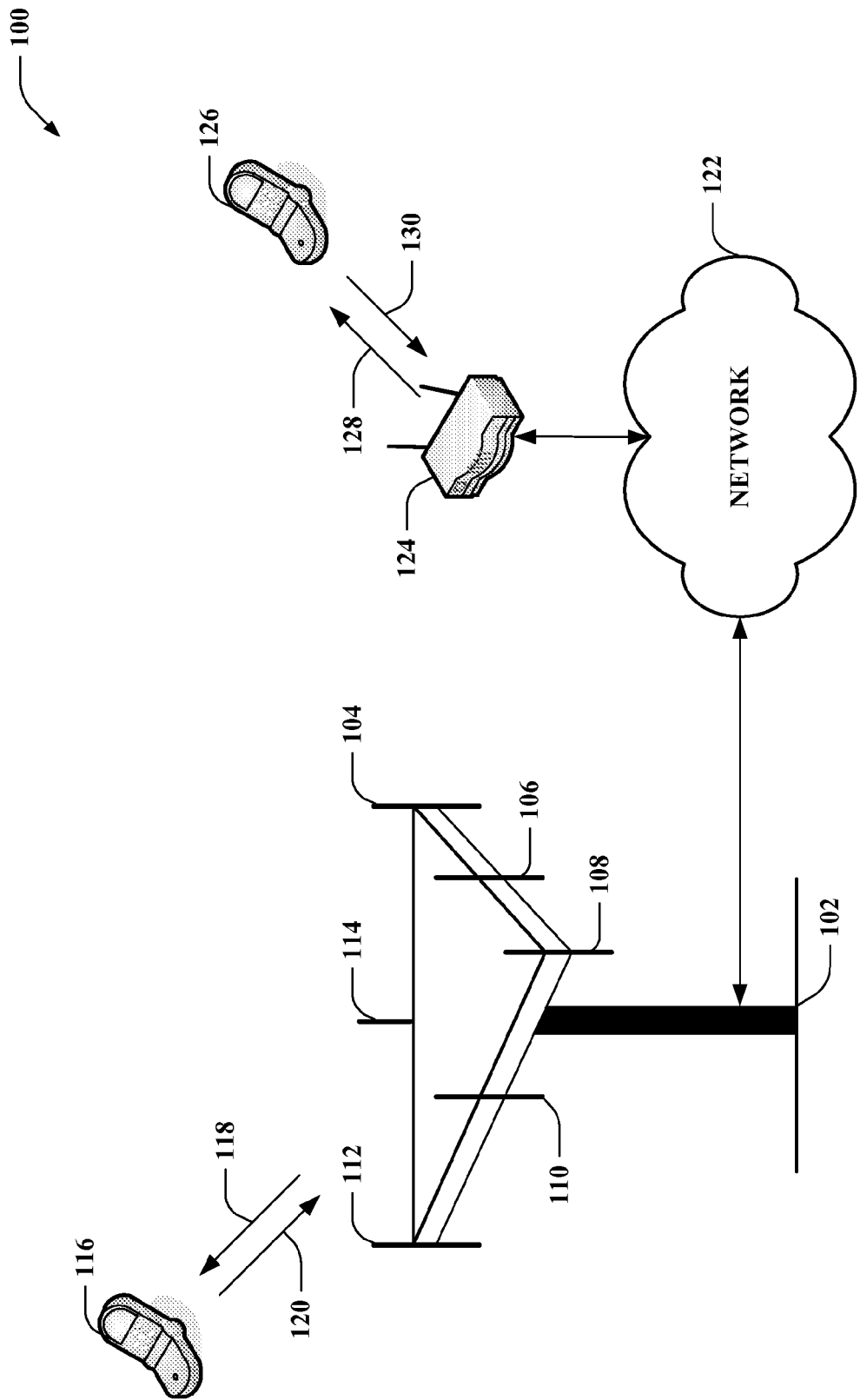
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3G network), over a backhaul link connection. The network 122 can store information regarding access parameters related to the mobile device 116 and 126 and other parameters of a wireless access network to provide service to the devices 116 and 126. Furthermore, a femtocell 124 can be provided to facilitate communicating with the mobile device 126 over forward link 128 and reverse link 130 (similarly to forward link 118 and reverse link 120, as described supra). The femtocell 124 can provide access to one or more mobile devices 126 much like the base station 102, but on a smaller scale. In one example, femtocell 124 can be configured in a residence, business, and/or other close range setting (e.g., theme park, stadium, apartment complex, etc.). The femtocell 124 can connect to the network 122 utilizing a backhaul link connection, which can be over a broadband Internet connection (T1/T3, digital subscriber line (DSL), cable, etc.), in one example. The network 122 can similarly provide access information for the mobile device 126.

According to an example, mobile devices 116 and 126 can travel over service areas initiating wireless access or performing cell reselection among disparate base stations and/or femtocells during travel or while stationary. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femtocell 124. In this regard, the mobile device 126 can have reselected one or more cells related to the femtocell 124 to receive more desirable wireless service access. In one example, the femtocell 124 can be a home access point for the mobile device 126 offering more desirable billing and/or other access options. In another example, the femtocell 124 can be related to a business or venue offering options or data tailored to the respective business or venue. Thus, mobile device 126 can reselect one or more cells related to the femtocell 124, in an idle and/or connected mode, to receive such tailored options. In addition, where mobile device 126 moves toward base station 102, it can reselect a cell related thereto, at some point, for a variety of reasons (e.g., to mitigate interference on the femtocell 124, to receive a more optimal signal or increased throughput, etc.).

In traveling over the service area, a given mobile device 116 and/or 126 can continually measure available base stations (such as base station 102), femtocells (such as femtocell 124), and/or other access points, to determine when cell reselection is beneficial to the mobile device 116 and/or 126. The measuring can include, for example, evaluating signal quality, throughput, services available, a wireless access provider related to the access point, and/or the like. Based on one or more of the measurements, the mobile device 116 and/or 126 can rank access points for reselection. Upon determining the ranking, the mobile device 116 and/or 126 can attempt cell reselection with the highest ranking access point.

In addition, the mobile devices 116 and 126 can maintain a blacklist of unsuitable access points and/or groups of access points, a whitelist of suitable access points and/or groups of accessible access points, and/or the like. The lists can comprise identifiers related to the cells, such as a cell identifier, a related PN offset, bandclass, radio channel, a group identifier associated with cells having common communication parameters, offering similar services, and/or the like. The mobile devices 116 and 126 can receive such identifiers from the base station 102 and/or femtocell 124 and can utilize the lists in selecting or reselecting cells for communication. In one example, at least one mobile device 116 and/or 126 can ignore or otherwise not choose cells or related access points or groups in the blacklist for selection/reselection and/or measuring related thereto. Similarly, the mobile device 116 and/or 126 can select cells or related access points or groups in the whitelist over other cells though the other cells have more desirable communication metrics, in one example. Moreover, the mobile device 116 and/or 126 can maintain the blacklist and/or whitelist.

In one example, the mobile device 116 and/or 126 can comprise an interface that allows a user to manage and maintain the blacklist and/or whitelist; the interface can permit a user thereof to add and/or remove cells from the lists, mark cells as permanent list members, and/or the like. In this regard, a user desiring access to a cell whenever the cell is in range can add the cell to the whitelist, and a user that wishes to ignore a cell though the cell is in range can add the cell to the blacklist. In the depicted example, mobile device 126 can have added femtocell 124 to its whitelist, and the mobile device 126 can select femtocell 124 for access though the base station 102 may have more desirable communication parameters. Similarly, the mobile device 116 can have added the femtocell 124 to its blacklist and accordingly connect to the base station 102 though the femtocell 124 may have various more desirable parameters with respect to the mobile device 116.

In another example, the mobile devices 116 and 126 can maintain the lists based on events occurring with respect to the mobile device, base station 102, network 122, etc. For example, where the mobile device 116 and/or 126 receives one or more denials or failures in attempting to access a base station related to a given cell, the mobile device 116 and/or 126 can add the cell or related base station to its blacklist. In addition, the lists can be modified according to a command from the network 122. Thus, the mobile devices 116 and 126 can receive such a command and modify its respective list accordingly. Moreover, the network 122 can provision a global list to the mobile devices 116 and 126, as well as changes to the global list; the mobile devices 116 and 126 can also maintain their respective local lists. Additionally, the mobile devices 116 and 126 can resolve conflicts between local and global lists according to schemes provisioned by the user, mobile device, network 122, and/or the like.

Figure 2:
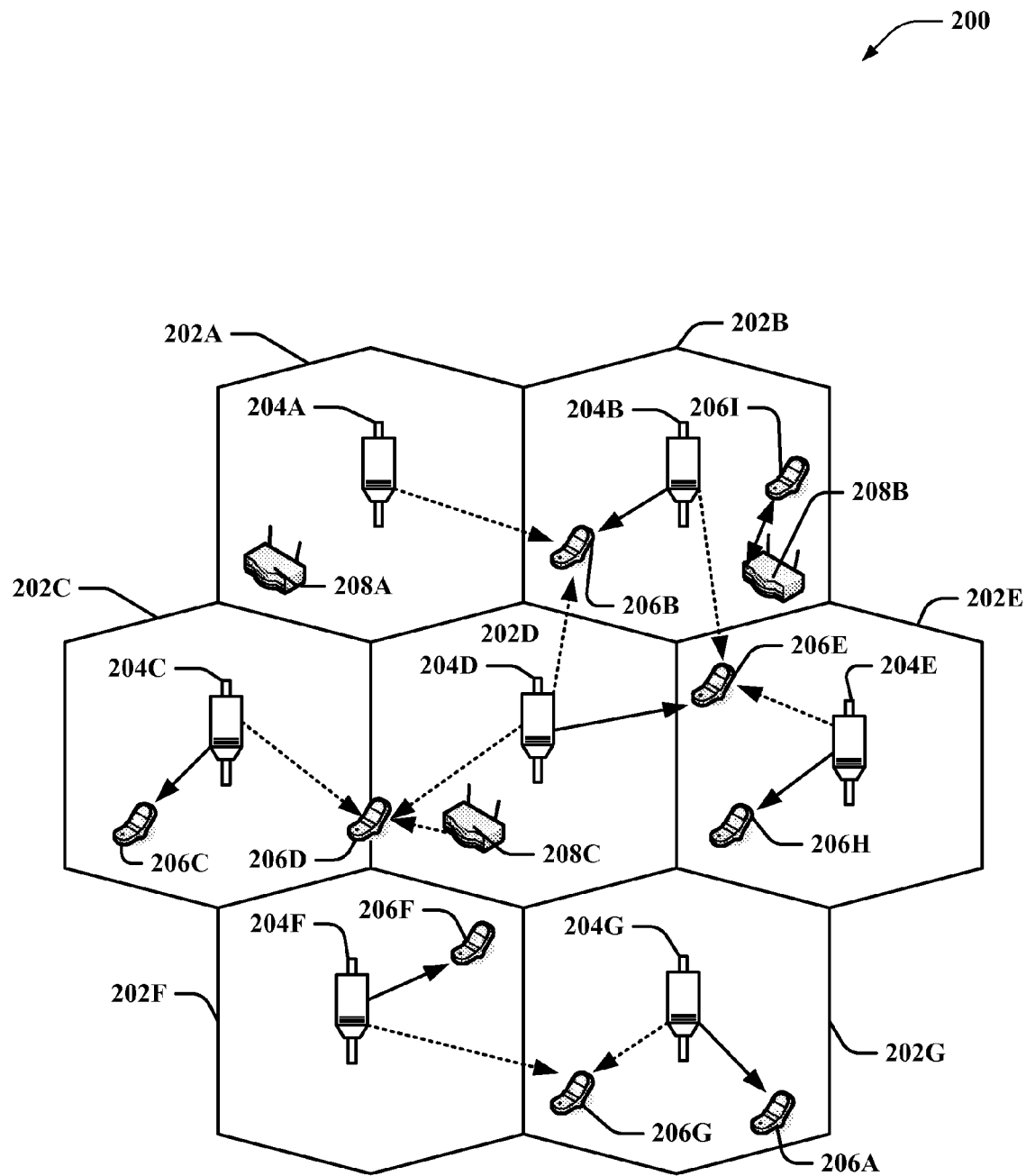
FIG. 2 is an illustration of a wireless communication network in accordance with aspects described herein.

Now referring to FIG. 2, a wireless communication system 200 configured to support a number of mobile devices is illustrated. The system 200 provides communication for multiple cells, such as for example, macrocells 202A-202G, with each cell being serviced by a corresponding access point 204A-204G. As described previously, for instance, the access points 204A-204G related to the macrocells 202A-202G can be base stations. Mobile devices 206A-206I are shown dispersed at various locations throughout the wireless communication system 200. Each mobile device 206A-206I can communicate with one or more access points 204A-204G on a forward link and/or a reverse link, as described. In addition, access points 208A-208C are shown. These can be smaller scale access points, such as femtocells, offering services related to a particular service location, as described. The mobile devices 206A-206I can additionally or alternatively communicate with these smaller scale access points 208A-208C to receive offered services. The wireless communication system 200 can provide service over a large geographic region, in one example (e.g., macrocells 202A-202G can cover a few blocks in a neighborhood, and the femtocell access points 208A-208C can be present in areas such as residences, office buildings, and/or the like as described). In an example, the mobile devices 206A-206I can establish connection with the access points 204A-204G and/or 208A-208C over the air and/or over a backhaul connection.

Additionally, as shown, the mobile devices 206A-206I can travel throughout the system 200 and can reselect cells related to the various access points 204A-204G and/or 208A-208C as it moves through the different macrocells 202A-202G or femtocell coverage areas. In one example, the one or more of the mobile devices 206A-206I can be associated with a home femtocell related to at least one of femtocell access points 208A-208C. For example, mobile device 206I can be associated with femtocell access point 208B as its home femtocell. Thus, though mobile device 206I is in macrocell 202B, and thus in coverage area of access point 204B, it can communicate with the femtocell access point 208B instead of (or in addition to) access point 204B. In one example, the femtocell access point 208B can provide additional services to the mobile device 206I, such as desirable billing or charges, minute usage, enhanced services (e.g., faster broadband access, media services, etc.).

For example, mobile device 206D can be associated with femtocell access point 208C. As the mobile device 206D moves from macrocell 202C into 202D and closer to access points 204D and/or 208C, it can begin the cell reselection process, as described herein. This can include, for example, measuring surrounding cell parameters (e.g., related to access points 204C, 204D, and 208C) to determine a desirable connection. The parameters can relate to, for example, signal quality, connection throughput, services offered, a service provider related to the access point, and/or the like. The mobile device 206D can additionally determine whether an identifier of the access point, or a related group identifier, is present in a blacklist of unsuitable access points and/or a whitelist of suitable access points, as described. In one example, this can occur before cell measurement such that cells in the blacklist need not be measured, and if at least one of the cells is in the whitelist, only cells in the whitelist need to be measured. In one example, the mobile device 206D can consider access points 204C, 204D, and 208C for selection/reselection. Where the access points 204C, 204D, and 208C are in a whitelist of the mobile device 206D and/or not in a blacklist of the mobile device 206D, the mobile device 206D can measure parameters for access points 204C, 204D, and 208C and rank the cells to determine whether to perform cell reselection from access point 204C to one of the others if their rank is higher.

Where one or more of the access points 204C, 204D, and 208C are in a blacklist of the mobile device 206D, however, the mobile device 206D can ignore the blacklisted cells during selection/reselection or measurement, in one example, regardless of other parameters related thereto. Similarly, where at least one of the access points 204C, 204D, and 208C is in a whitelist of the mobile device 206D, the mobile device 206D can ignore any of the access points 204C, 204D, and 208C not in the whitelist. The mobile device 206D can select/reselect at least one of the access points 204C, 204D, and/or 208C that has the most desirable measurements, is not in the blacklist, and is not absent from the whitelist where at least one of the other access points 204C, 204D, and/or 208C is present in the whitelist.

As described, the mobile device 206D can maintain a local blacklist and/or whitelist according to user interface input, device events, network provisioning, etc. In addition, the mobile device 206D can receive maintenance provisioning from the network (e.g., via access points 204C, 204D, and/or 208C or other access points communicating with the mobile device 206D). The maintenance provisioning can affect the local blacklists/whitelists and/or global blacklists or whitelists (e.g. lists generated by the network and maintained at the mobile device 206D). Moreover, the mobile device 206D can conform the blacklists/whitelists to defined boundaries when adding entries via user specification, network specification, or otherwise, as described in further detail infra.

Figure 3:
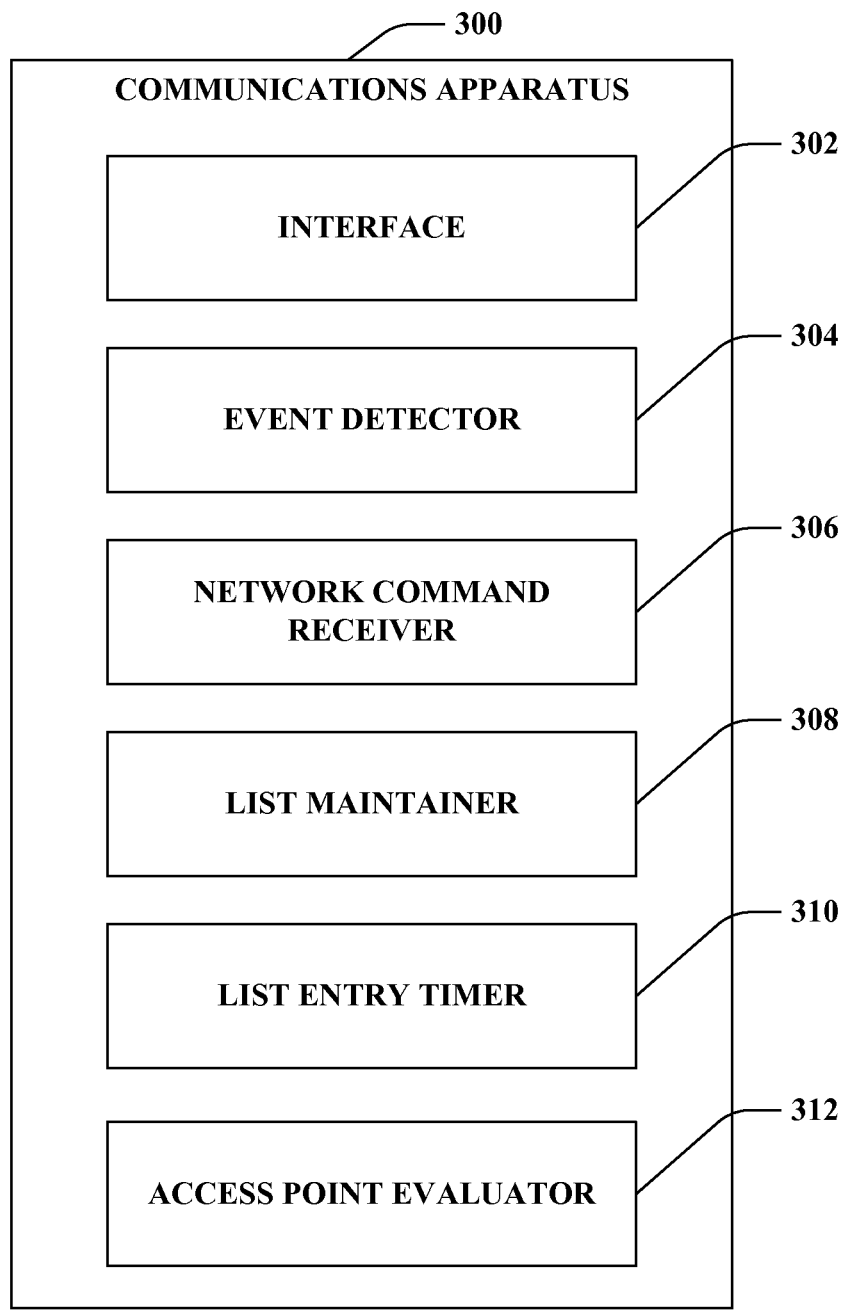
FIG. 3 is an illustration of an example communications apparatus for employment within a wireless communications environment.

Turning to FIG. 3, illustrated is a communications apparatus 300 for employment within a wireless communications environment. The communications apparatus 300 can be a mobile device or a portion thereof, or substantially any communications apparatus that communicates over and/or receives access to a wireless network. The communications apparatus 300 can include an interface 302 that allows specification of access point list entries from a user or disparate device or component of the communications apparatus 300, an event detector 304 that can determine occurrences that affect list entry maintenance, a network command receiver 306 that can detect network list maintenance control events, a list maintainer 308 that can manage a list of access points, a list entry timer 310 that can remove list entries based at least in part on expiration of one or more timers, and an access point evaluator 312 that can analyze neighboring access points to determine an identifier, operating or communication parameters, and/or the like related to the access points to determine whether to establish subsequent communication therewith.

In one example, as described, the list maintainer 308 can manages a blacklist of unsuitable access points from which access should not be requested, a whitelist of suitable access points from which access should be requested over other access points regardless or with less emphasis on other communication parameters, and/or the like. In addition, the list maintainer 308 can manage a local list (e.g. a user controlled list or device controlled list that can be respectively managed via the interface 302 or the event detector 304) and/or a global network provisioned list (e.g., an operator controlled list that can be managed based on commands received from a network operator by the network command receiver 306 over the wireless network), as described. The list maintainer 308 can manage the lists based on access point identifiers, which can include base identifiers of the access points, group association identifiers (e.g., related to groups offering common services, etc.), one or more communication parameters, such as PN offset, bandclass, radio channel, and/or the like, etc. In one example, the list maintainer 308 can manage a list of access points that can be identified as blacklisted or whitelisted entries in a single list. The list maintainer 308 can manage both local and global lists in this example as well.

According to an example, the interface 302 can allow user and/or other component specification of list additions, deletions, flushing, or other management tasks. In this regard, the interface 302 can be a user interface (UI), such as a graphical UI (GUI), an application program interface (API), and/or the like. In one example, the list maintainer 308 can manage a blacklist of unsuitable access points, and the interface 302 can allow a user to add access points to the blacklist by explicitly identifying the access point. For example, the interface 302 can prompt the user for addition to the blacklist upon detecting a new access point. Additionally, the interface 302 can allow a user to remove access points from the blacklist by displaying the access points and facilitating selecting one or more for deletion; in one example, the interface 302 can allow searching for access points in the list for deletion, deletion of groups related by one or more communication parameters, and/or the like. Similarly, the interface 302 can allow the user to flush the list. In addition, the interface 302 can allow a user or component to perform similar functionality to a whitelist of suitable access points. For example, the interface 302 can allow a user to add an access point to the whitelist upon entering the cell of the access point, receiving an indication to establish wireless access with the access point, and/or the like. Moreover, the interface 302 can allow permanent list additions, for example where the list maintainer 308 is limited in list entries. The interface 302, in one example, can also allow manual scans of neighboring access points, causing the access point evaluator 312 to detect one or more neighboring access points and provide a list of resulting neighboring access points for display on the interface 302.

In another example, the event detector 304 can perform list operations (e.g., add/remove entries, flush the list, etc.) based at least in part on certain events. For example, as described, the event detector 304 can determine one or more failed access attempts related to an access point and can automatically add the access point to the blacklist via the list maintainer 308 (e.g., by requesting addition or otherwise) after a threshold number of request failures or denials. In yet another example, the event detector 304 can determine a current or previous access point that provides desirable wireless access to the communications apparatus 300 and can accordingly add the access point to the whitelist managed by the list maintainer 308. The determination of desirable access can be based on a number of access requests via the interface 302, a determined level of service, throughput or other functionality, a measured time of access point utilization by the communications apparatus 300, a number of requests or data transferred between the communications apparatus 300 and/or the access point, packet error rate (PER), such as when using voice over internet protocol (VOIP), etc.

In one example, the event detector 304 can determine a change in operating parameters by the access point. For example, the access point can advertise an identifier along with other parameters. The list maintainer 308, or other component, can store the parameters, and the event detector 304 can compare parameters upon communicating with the access point with those stored. Where the parameters have changed, in one example, the event detector 304 can utilize the list maintainer to remove the access point from the blacklist and/or whitelist so the communications apparatus 300 can determine whether to re-add the access point based on the modified parameters. Similarly, the event detector 304 can detect modification in access point authorization credentials (e.g., and/or the access point evaluator 312 can determine changing parameters upon detecting a neighboring access point). In this case, the event detector 304 can remove the access point from the blacklist or whitelist, if present; this allows the communications apparatus 300 to try selecting/reselecting (or camping on) the access point before determining whether to re-add it to the blacklist or whitelist. In another example, the event can be caused by a user on the communications apparatus 300, such as dialing a number to indicate list operation (e.g., dial *229 to flush the list).

Moreover, in an example, the network command receiver 306 can determine network commands related to list management. In one example, the network command receiver 306 can receive a global blacklist or whitelist of access points from a network component (via an access point, other communications apparatus, or otherwise). Similarly, the network command receiver 306 can receive a list related to the communications apparatus 300 specifically (and/or a group to which the communications apparatus belongs). Further, the network command receiver 306 can receive commands related to managing local and/or global lists, such as commands to add/remove certain access point or related group entries, commands to flush the lists, and/or the like.

In one example, the network command receiver 306 can receive the commands based at least in part on a previous request for network list information; it is to be appreciated that the commands can be received without query as well, however. Additionally, the network command receiver 306 can receive a notification of access point operating parameter or authorization credential change and can accordingly remove the access point from the blacklist or whitelist, as described previously with respect to the event detector 304, for example. Moreover, the network command receiver 306 can receive the commands over the air (OTA), via short message service (SMS) message from the network, using a backhaul link, and/or the like. In addition, the command can be to add a preferred user zone list (PUZL) or preferred roaming list (PRL) entry corresponding to the access point—this allows the communications apparatus 300 to prefer the access point similarly to whitelisting, as described herein, on an individual access point basis. In one example, the whitelist and/or related entries can be stored in a PUZL database. In addition, this mechanism can be used to supersede blacklist entries since PUZL can take precedent over the lists manages by the list maintainer 308. Where PUZL is utilized, it is to be appreciated that the list maintainer 308 can additionally manage a list of additional parameters not stored in the PUZL, for example.

The list maintainer 308, in one example, can manage local and/or global whitelists and/or blacklists, as described. The lists can respectively relate to a user controlled list and/or an operator controlled list, as described above. The list maintainer 308 can manage the lists using access point identifiers, which can be received over the air by the various access points, in one example. Additionally or alternatively, the list maintainer 308 can utilize a group identifier advertised by a given access point that indicates a commonality between the access point and other access points (e.g., a common service provider, architecture, communication protocol(s), bandwidth, and/or the like). In addition, the list maintainer 308 can manage the list based on communication parameters, such as a PN offset, bandclass, radio channel, and/or the like related to one or more access points. In this regard, the list maintainer 308 can allow additions and/or deletions to the list using the proper indicator.

In addition, the list maintainer 308 can process add/remove requests with respect to the blacklist(s) and/or whitelist(s) received from the interface 302, event detector 304, and/or network command receiver 306, as described. In addition, the list maintainer 308 can flush the list based on events or commands received at the interface 302, event detector 304, and/or network command receiver 306. The list maintainer 308 can also respond to requests from other components of the communications apparatus 300, such as access point evaluator 312, to determine whether certain access points being measured for selection/reselection are present in the blacklist(s) and/or whitelist(s). It is to be appreciated that where the list maintainer 308 manages local and global lists, conflicts can occur (e.g., a local whitelist may have a common entry with the global blacklist). In this case, the list maintainer 308 can determine which list takes precedent—this can be based on network or communication apparatus 300 specification, list entry update time for the access point, etc. In addition, the list maintainer 308 can perform automated activities; for example, where a whitelist access point is added to the blacklist, the list maintainer 308 can automatically delete the access point from the whitelist, prompt via the interface 302 for a resolution, query the underlying wireless network for resolution, and/or the like.

Also, the list maintainer 308 can enforce rules for processing additions, deletions etc. In one example, the lists can have maximum sizes such that the list maintainer 308 can insert entries into the list and expunge some list entries to make room for new entries where necessary (e.g., in view of the maximum size). In one example, the list maintainer 308 can use first-in-first-out (FIFO) to remove latest entries in favor of new entries. Thus, where an access point entry is the oldest or otherwise last entry in the list, it can be deleted upon the list maintainer 308 inserting a new access point. In another example, the list maintainer 308 can maintain a histogram of encountered black list access points and can remove list entries that are oldest and have a lowest number of encounters, in favor of new entries. In one example, the following formula can be utilized to compute a metric for given list entries to select for removal.

$$\frac{NE}{(K + (T_{now} - T_{last}))^a}$$

where NE is the number of number of encounters of the blacklisted access point, K is a positive constant, $T_{now}$ is the current time, $T_{last}$ is the last time of encounter by the communications apparatus 300, an a is selectable tuning variable to achieve desirable results.

Also, the list maintainer 308 can utilize PUZL formatting and/or a PUZL in the communications apparatus 300 to provide the list functionality. For example, the list maintainer 308 can assume all access points are blacklisted unless in the PUZL (in which case they are whitelisted). Using this functionality, in one example, the list maintainer 308 can manage the PUZL according to list commands received (e.g., a command to add to a blacklist can correspond to deleting from the PUZL, removing from the blacklist can correspond to adding to the PUZL, etc.). In addition, the list maintainer 308, for example, can store the lists in a memory related to the communications apparatus 300, such as on a removable user identity module (R-UIM), subscriber identity module (SIM), universal integrated circuit (UICC) or similar card. Thus, in this example, the list information can be related to the card and transferred among wireless devices.

In an example, the list maintainer 308 can leverage the list entry timer 310 to remove list entries. In this regard, after a period of time, entries can be removed from the blacklist and/or whitelist such that the communications apparatus 300 re-evaluates the access point or group of access points corresponding to the entry. The list entry timer 310 can determine times for removing access point list entries using substantially any timing mechanism. For example, the list entry timer 310 can comprise an expiration timer where each entry has an associated time after which it is removed from the list. In another example, the list entry timer 310 can comprise a telescopic timer that can be index based. For example, a back off timer can be utilized after expiration of an initial timer where the timer value is based on an index related to a number of times the access point is added to the blacklist. In another example, the timer can be based on a number of failed access attempts, as described, such that a back off timer parameter can be multiplied by the number of failed attempts to produce the timer. It is to be appreciated that the list entry timer 710 can escalate the back off timer per failed attempt (or encounter in the previous example), for instance. In addition, it is to be appreciated that the list entry timer 710 can utilize a combination of the above timers as well.

According to an example, the list maintainer 308 can manage and provide virtual lists. For example, the list maintainer 308 can consider substantially all femtocell access points analyzed by the access point evaluator 312 as blacklist entries unless they are in an associated whitelist or PUZL. Thus, the list maintainer 308, in this example, can provide a blacklist (e.g., to the interface 302) based on generating a list of neighboring femtocell access points and removing those access points already in the associated whitelist or PUZL. In another example, the list maintainer 308 can initially add substantially all femtocells discovered by the access point evaluator 312 to an actual blacklist. In this regard, the access point evaluator 312 can additionally differentiate between femtocell access points and macrocell access points and can, in one example, implement the foregoing lists and respective management functionality for only femtocell access points, only macrocell access points, a combination, and/or the like.

In this example, the access point evaluator 312 can, for example, collect geographic information related to discovered access points to filter out access points that are not in preferred geo-locations, which can be indicated by a user via interface 302, in one example. The access point evaluator 312 can deliver identifiers related to the access points (e.g., base access point identifiers, group identifiers, communication parameters, and/or the like, as described) to the interface upon receiving a request for a current list of neighboring access points. The access point evaluator 312 can filter access points that do not match desired geo-location parameters out of the list. The interface 302 can allow selection of an access point from list for which to establish wireless communications. In one example, the interface 302 can additionally add the access point to a blacklist or whitelist by explicit indication and/or implicitly based on selecting the access point for communication establishment. It is to be appreciated that the access point evaluator can establish connection to one or more access points based on analyzing the blacklist(s) and/or whitelist(s), in one example.

Figure 4:
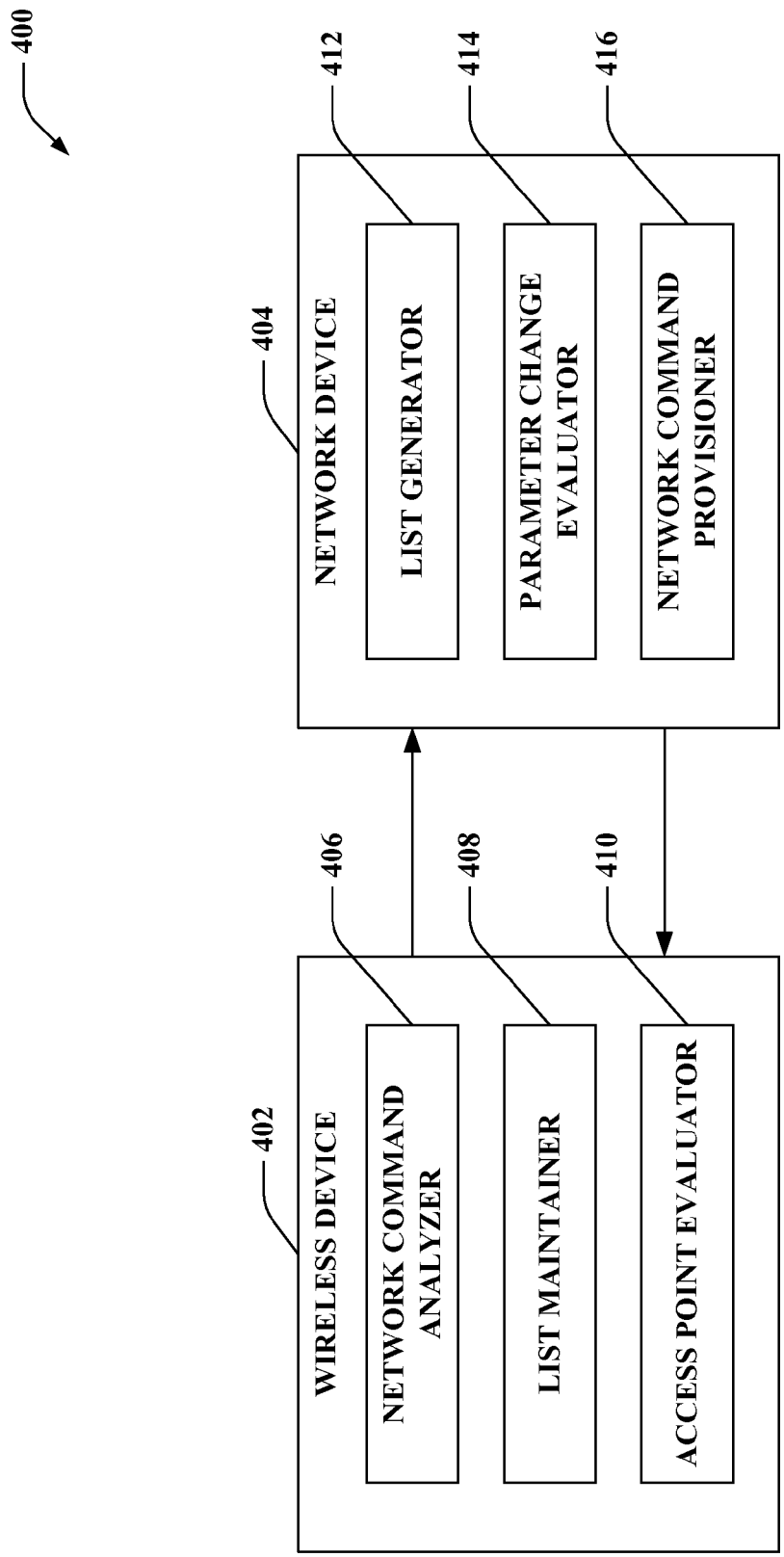
FIG. 4 is an illustration of an example wireless communications system that effectuates maintaining local lists of access points for subsequent communication establishment.

Now referring to FIG. 4, illustrated is a wireless communications system 400 that facilitates wireless device access point list management. Wireless device 402 can be a mobile device (including not only independently powered devices, but also modems, for example), a base station, and/or portion thereof, or substantially any wireless device. The network device 404 can be substantially any core network component that communicates with and provides wireless access to the wireless device 402 via substantially any communications medium (e.g., wired or wireless connection, via base station or other access point, etc.). Moreover, system 400 can be a MIMO system and/or can conform to one or more wireless network system specifications (e.g., EV-DO, 3GPP, 3GPP2, 3GPP LTE, WiMAX, etc.) and can comprise additional components to facilitate communication between wireless device 402 and network device 404 as well as providing network access to the wireless device 402.

The wireless device 402 can comprise a network command analyzer 406 that can receive and evaluate network list provisioning commands, as described, a list maintainer 408 that can maintain local and/or global blacklist(s) and/or whitelist(s) related to discovered access points (e.g., user and/or operator controlled lists), and an access point evaluator 410 that can discover one or more access points and associated communication parameters. The network device 404 comprises a list generator 412 that can create a global blacklist and/or whitelist of access points related to the network device 404 (e.g., an underlying service provider of the network device 404) or the wireless device 402 (e.g., based on a type or service provider of the wireless device 402), a parameter change evaluator 414 that can detect modification in communication or operating parameters of an access point (not shown), and a network command provisioner 416 that can generate and transmit network commands related to maintaining the local and/or global whitelist(s) and/or blacklist(s).

According to an example, the list maintainer 408 can manage local and/or global whitelist(s) and/or blacklist(s). Management can occur, as described, via a provided interface, local event processing, network command processing, and/or the like. The list maintainer 408 can acquire a list or create a list with no initial entries. In addition, as described, the list maintainer 408 can place access points, which the access point evaluator 410 initially discovers, in a blacklist allowing subsequent removal and/or specification in a whitelist. Thus, as the wireless device 402 travels over a wireless network coverage area, the access point evaluator 410 can discover access points and provide related information to the list maintainer 408 for list processing, as described above. In another example, the list maintainer 408 can receive one or more list and/or list management commands from the network device 404.

For example, the list generator 412 can generate access point lists related to a service provider associated with the network device 404, loading of different access points related to the wireless device 402, a service provider associated with the wireless device 402, a type or capability of the wireless device 402, a subscription related to the wireless device 402, a user of the wireless device 402, and/or the like. In addition, the list can identify the access points using one or more different identifiers, such as an explicit access point identifier advertised by the access point, a group identifier related to a set of access points having common parameters or features, a communication parameter (e.g., PN offset, bandclass, radio channel, etc.) and/or the like. In this regard, the list generator 412 can create and manage lists for provisioning to wireless devices. The lists can be provisioned to the wireless device 402, for example, using the network command provisioner 416. In one example, the provisioning of initial local and/or global blacklist(s)/whitelist(s) can be performed upon communication establishment from the wireless device 402 or substantially any network or device event. The network command analyzer 406 can receive and accordingly store the list(s) for local management, as described herein.

Thus, whether obtained from a network device 404 or locally created, as described herein, the list maintainer 408 can store lists and manage list operations such that the wireless device 402 can obtain a current list when evaluating access points for initial selection or reselection. Once lists are provisioned and/or created, the network device 404 can also provision list updates (e.g., additions, removals, flushes, etc.) as well. For example, the parameter change evaluator 414 can detect modification to one or more parameters related to an access point in one or more lists managed by the list generator 412. The parameters, for example, can relate to PN offset, bandclass, group association, authorization credentials, added or removed functionality, bandwidth, service provider compatibility, and/or the like. The network command provisioner 416 can generate a network command update to the wireless device 402 based on the parameters. The network command analyzer 406 can receive the update and determine the parameter modification. Based on the modification, the network command analyzer 406 can forward the modification information to the list maintainer 408 for local updating of the list. In another example, the modification can cause the list maintainer 408 to remove or add the access point to a managed whitelist and/or blacklist. For example, where the modification is a change in authorization credentials, and the access point is in a blacklist, the list maintainer 408 can remove the access point from the blacklist causing the access point evaluator 410 to detect the access point when in range such that the wireless device 402 can reattempt connection with the modified parameters. It is to be appreciated, however, that the access point can be re-added to the blacklist, for example, where reattempted access fails regardless of the modified parameters. It is to be appreciated that the network command provisioner 416 can also determine appropriate list action based on the modification and can transmit a list action command to the wireless device 402.

In one example, the network command provisioner 416 can also generate and transmit commands to the wireless device 402 related to setting maximum list sizes and/or list removal instructions, as described above. Additionally, the network command provisioner 416 can transmit commands to the wireless device 402, and the network command analyzer 406 can receive the commands, using SMS functionality, via a base station, over a backhaul link, and/or the like. In addition, provisions can be PUZL list entry commands. Thus, in one example, the parameter change evaluator 414 can determine a modification to one or more parameters related to an access point. The network command provisioner 416 can accordingly generate an SMS message comprising a command to add the access point to a whitelist (e.g., a PUZL addition command) or remove from a blacklist, in one example. The network command provisioner 416 can subsequently transmit the SMS to the wireless device 402. The network command analyzer 406 can receive the SMS message, and the list maintainer 408 can perform the action indicated in the message.

For example, where the command is a whitelist addition, the list maintainer 408 can add the access point to a whitelist or PUZL in view of the parameter modification to attempt wireless access to the access point upon a subsequent discovery of the access point by the access point evaluator 410. In one example, the list maintainer 408 can determine network provisioned PUZL entries supersede locally housed lists and can additionally remove the access point from a blacklist, if present, when receiving a PUZL entry command, as described. In another example, the network command provisioner 416 can indicate the actual update in the SMS message, in which case the network command analyzer 406 can determine an action based on the SMS message (e.g., modify parameters of the local list to match the update, add the access point or related group identifier to a whitelist, remove the access point or related group identifier from a blacklist, etc.). The list maintainer 408 can perform the determined action, as described.

In yet another example, the network command provisioner 416 can generate timed events to the wireless device 402. For example, the network command provisioner 416 can create and transmit an event to flush all lists at a given time in the future. The network command analyzer 406 can receive the message, determine the command, and accordingly instruct the list maintainer 408 to flush the lists at the specified time. The list maintainer 408 can comply with the flush instructions, in one example. It is to be appreciated that the network command provisioner 416 can implement measures to ensure the commands are received by substantially all intended wireless devices, such by repetitive transmission, requiring acknowledgement responses, and/or the like.

Figure 5:
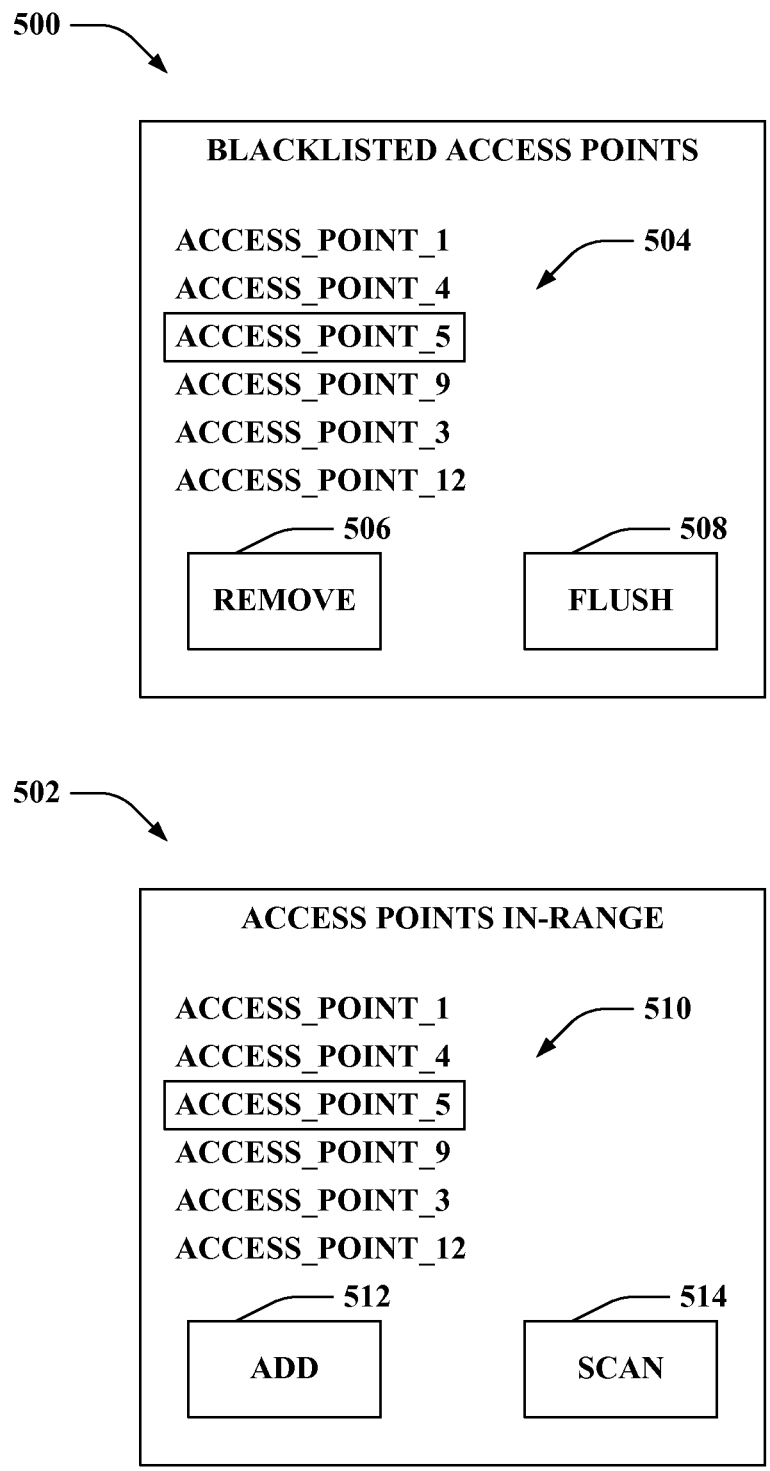
FIG. 5 is an illustration of example interfaces in accordance with aspects described herein.

Turning now to FIG. 5, example user interfaces 500 and 502 are shown that can be utilized to provide access point list management at a mobile device, as described herein. Interface 500, for example, shows a list of blacklisted access points 504; an access point identifier is shown, but other identifiers can be used as well, such as a group association identifier, communications parameters or metrics, and/or the like, as described. The access points can have been blacklisted by a user via the interface, by the device based on network command and/or events as described, and/or the like, for example. As shown, the interface 500 can allow selection of access points in the list 504. The interface 500 also provides a remove button 506 to facilitate removal of one or more selected access points in the list 504. Additionally, a flush button 508 is shown to allow flushing the entire list. It is to be appreciated that many other functionalities can be provided by interfaces, such as obtaining further information regarding the access points, setting a timer for access point removal from the blacklist, marking a blacklist entry as permanent, and/or the like; the interface 500 shown is but one example.

Interface 502 shows a list of in-range access points 510. The list 510 can be displayed in response to engaging a scan button 514, in one example. Again, the list 510 is selectable, and an add button 512 is provided to add a selected access point from the list 510 to a blacklist. It is to be appreciated that similar interfaces can be provided for a whitelist; in fact, the interface 502 can have both whitelist and blacklist add buttons. These interfaces 500 and 502 are but one of substantially limitless possible interfaces and are presented herein as examples. In addition, the layout of the example interfaces 500 and 502 are but one of substantially limitless layouts that can be utilized. Also, it is to be appreciated that substantially any available interface technology or framework can be utilized to develop and render the interface to a mobile device.

Referring to FIGS. 6-9, methodologies relating to locally managing blacklist and/or whitelists for wireless devices are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 6:
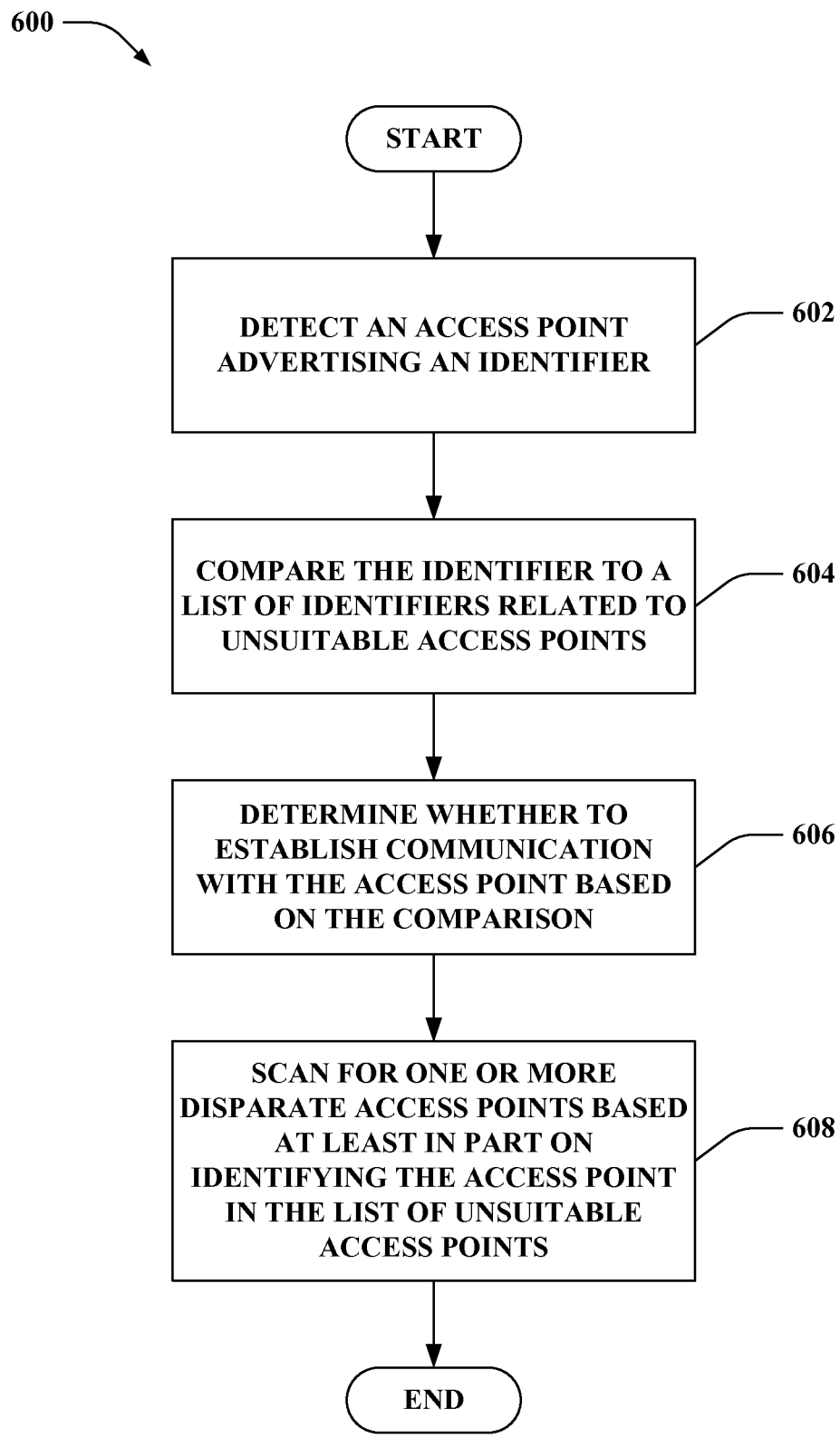
FIG. 6 is an illustration of an example methodology that facilitates utilizing a locally managed blacklist.

Turning to FIG. 6, an example methodology 600 that facilitates utilizing a blacklist in evaluating cells for initial selection and/or reselection is displayed. At 602, an access point advertising an identifier is detected. As described, the identifier can be related to a base identifier of the access point, a group association identifier, one or more communication parameters, and/or the like; further, the identifier can be utilized to differentiate macrocell from femtocell access points, in one example. At 604, the identifier can be compared to a list of identifiers related to unsuitable access points. The list can be locally or globally maintained and/or specified, as described. Furthermore, the functionality can be similarly implemented for a whitelist of suitable access points. At 606, it can be determined whether to establish communication with the access point based on the comparison. For example, if the access point is in the list of unsuitable access points, communication should not be established. At 608, one or more disparate access points can be scanned based at least in part on identifying the access point in the list of unsuitable access points. Thus, the blacklisted access point is ignored, as described.

Figure 7:
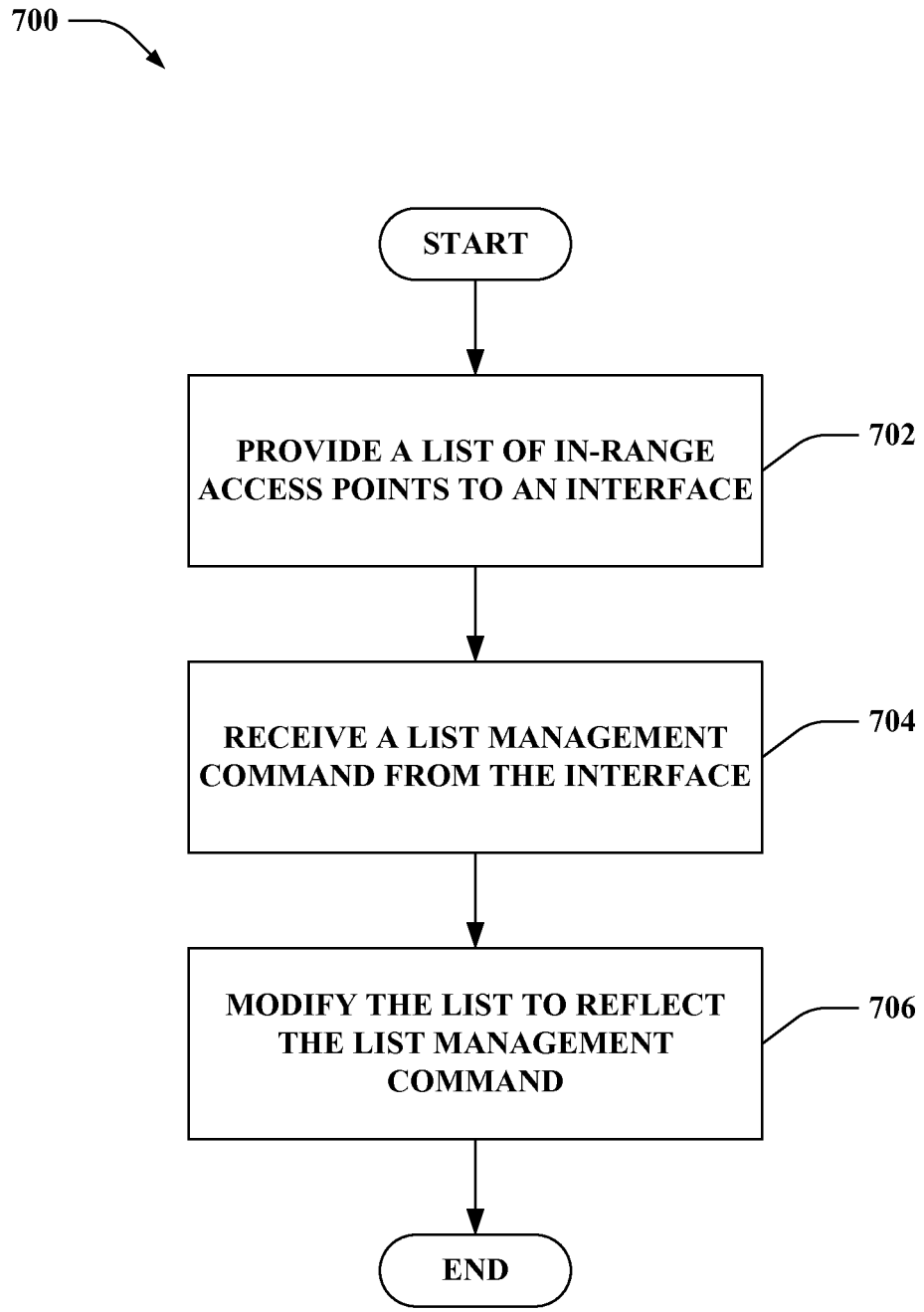
FIG. 7 is an illustration of an example methodology that facilitates managing access point lists based on commands received from an interface.

Referring to FIG. 7, an example methodology 700 is shown that facilitates allowing blacklist and/or whitelist manipulation through a provided interface. At 702, a list of in-range access points is provided to an interface. The list can be obtained, for example, by scanning for the access points and recording a base identifier, group association identifier, communication parameters, and/or the like as advertised by the access point. In addition, the interface can be a GUI, API, and/or the like. At 704, a list management command can be received from the interface. The command can relate to, for example, adding or removing access points from the list, flushing the list, retrieving access point parameters, and/or the like. At 706, the list can be modified to reflect the list management command. Thus, upon subsequent request for the list by an interface or for selecting/reselecting access points in the wireless network, an updated list can be retrieved and provided.

Figure 8:
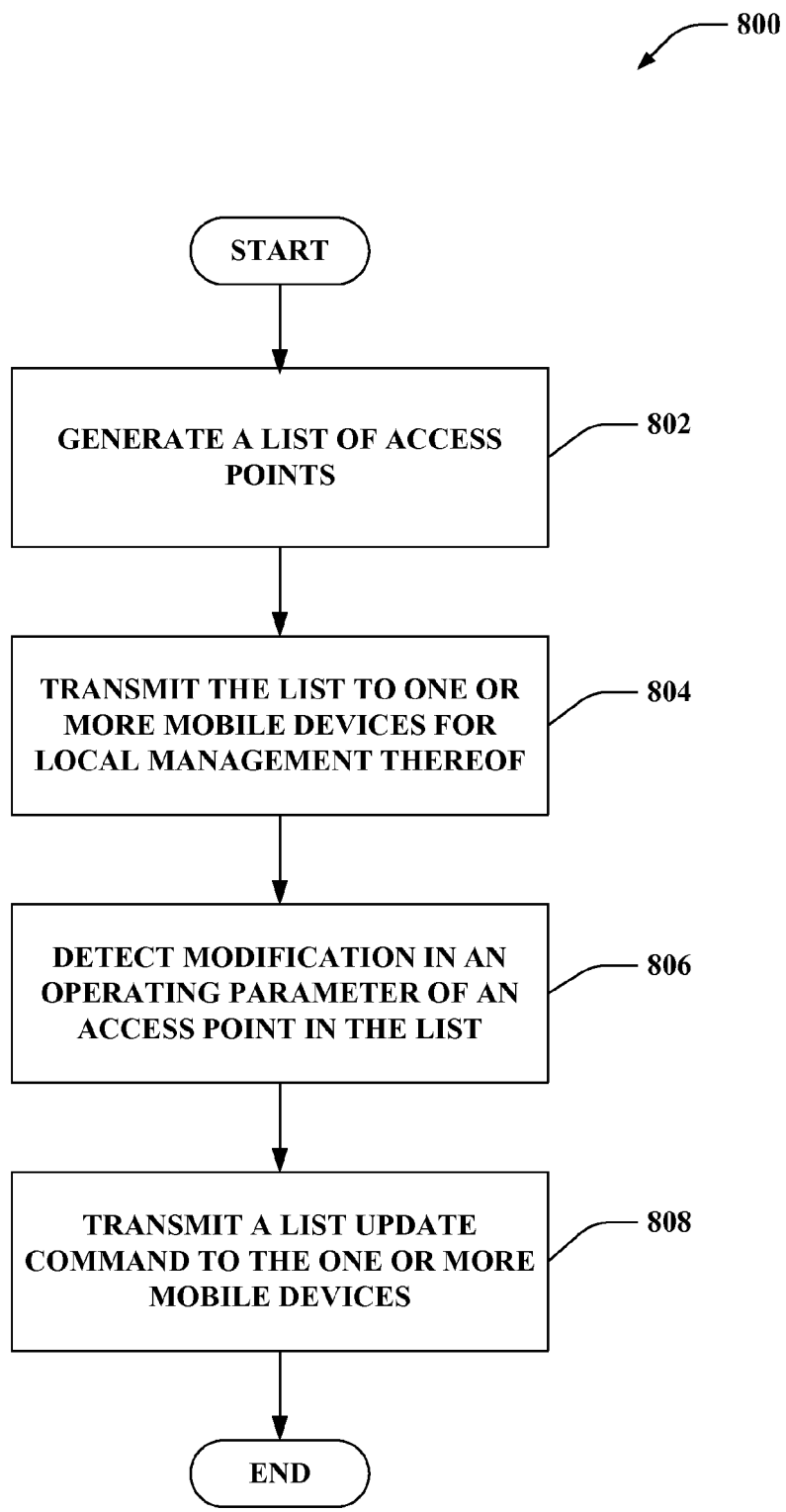
FIG. 8 is an illustration of an example methodology that facilitates network provisioning of access point lists and related updates.

Turning to FIG. 8, illustrated is an example methodology 800 that facilitates network provisioning of list updates to one or more mobile devices. At 802, a list of access points can be generated. The list can correspond to a blacklist or whitelist according to network specification, specific to a wireless network provider, specific to a subscriber or device, and/or the like. In one example, the list can be retrieved from a database that stores the list for a given mobile device. At 804, the list can be transmitted to one or more mobile devices for local management thereof. Thus, the mobile device can retain a copy of the list and receive provisioned updates to ensure its copy reflects network specific information.

At 806, a modification in an operating parameter of an access point in the list can be detected, and at 808, a list update command can be transmitted to the one or more mobile devices. Thus, for example, if the access point was in a blacklist and changed an operating parameter, a list update indicating the change can be transmitted to the mobile device indicating to remove the access point from the blacklist. In this regard, the mobile device can attempt connection to the access point in view of the modified parameter. In another example, the modified parameter can be transmitted to the mobile device to allow the device to determine whether to reattempt access in view of the modified parameter.

Figure 9:
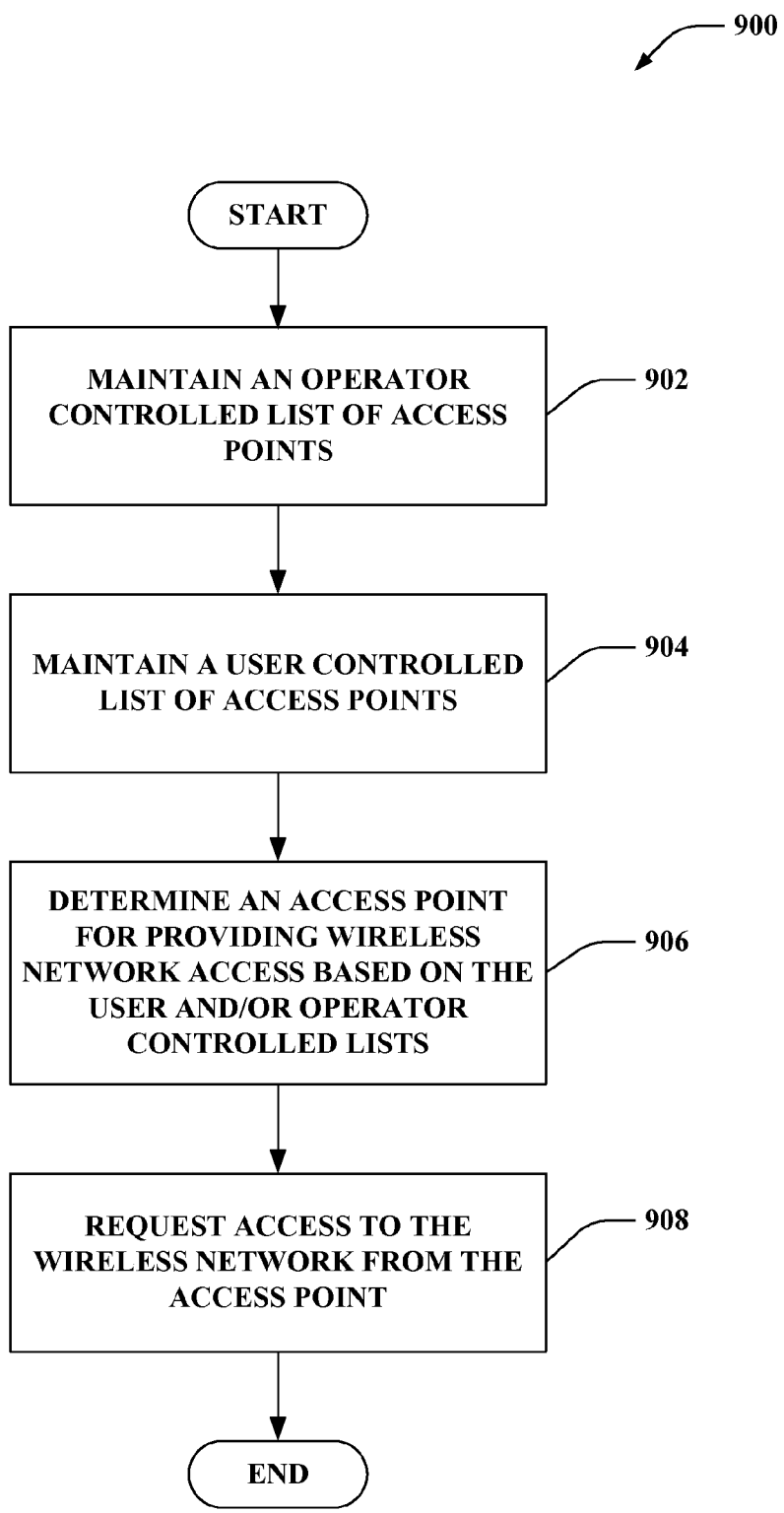
FIG. 9 is an illustration of an example methodology that facilitates maintaining a plurality of access point lists.

FIG. 9 illustrates an example methodology that facilitates maintaining multiple access point lists. At 902, an operator controlled list of access points can be maintained. As described, this can relate to a list of access points for which updates are received from a wireless network and accordingly processed. In addition, the list can be a blacklist or whitelist, as described, and/or a general list with blacklist/whitelist identifiers. At 904, a user controlled list of access points can be maintained as well. This can relate to a list of access points that can be updated using a provided interface (e.g., GUI, API, and/or the like), as described. Similarly, this list can be a blacklist, whitelist, etc. At 906, an access point for providing wireless network access can be determined based on the user and/or operator controlled lists. Thus, where at least one of the lists is a black list, access points in the blacklist will not be considered for requesting wireless network access. Similarly, where at least one of the lists is a whitelist, the access point can be considered for access. It is to be appreciated that list conflicts can exist between the user and operator controlled lists, and mechanisms can be defined to handle such conflicts, as described. At 908, access to the wireless network can be requested from the determined access point.

It will be appreciated that, in accordance with one or more aspects described herein, inferences can be made regarding updating blacklists and/or whitelists according to interface command, detected events, network provisioning, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
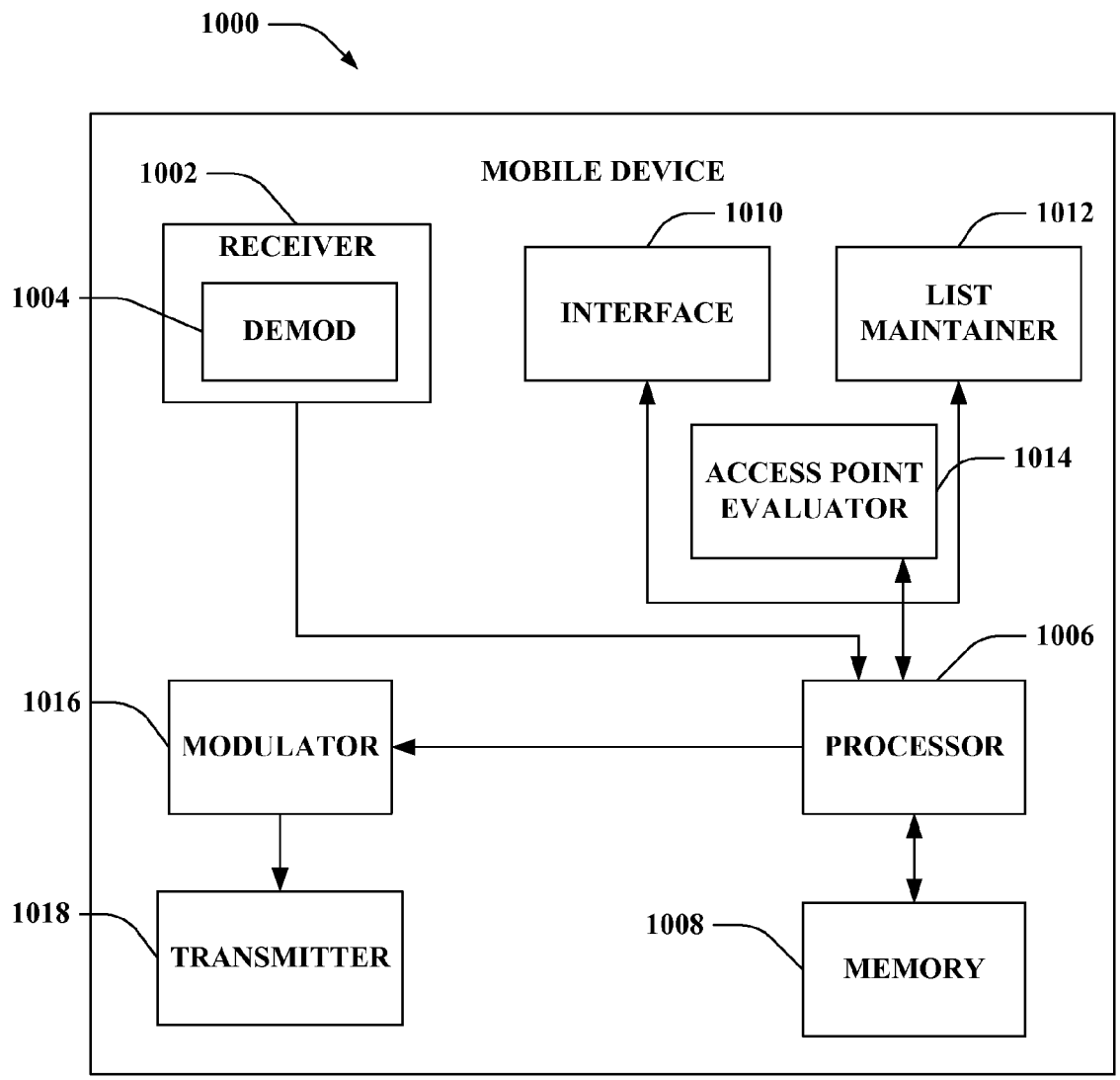
FIG. 10 is an illustration of an example mobile device that facilitates managing lists of access points.

FIG. 10 is an illustration of a mobile device 1000 that facilitates maintaining a blacklist and/or whitelist related to access points in a wireless network. Mobile device 1000 comprises a receiver 1002 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 1002 can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1018, a processor that controls one or more components of mobile device 1000, and/or a processor that both analyzes information received by receiver 1002, generates information for transmission by transmitter 1018, and controls one or more components of mobile device 1000.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 can further be operatively coupled to an interface 1010 that allows specification of commands related to managing a blacklist or whitelist of access points, as described herein, a list maintainer 1012 that manages such lists, and an access point evaluator 1014 that can establish communication with an access point based at least in part on the list(s). In one example, the interface 1010 can list available access points and can allow selection and/or specification of access points to a blacklist and/or whitelist. In addition, the interface 1010 can allow scanning for access points, marking one or more access points as a permanent list entry, and/or the like, as described. In addition, the list maintainer 1012 can process requests from the interface 1010 as well as event driven and network provisioned list management, as described. The access point evaluator 1014 can initially select and/or reselect an access point or related cell for wireless network communication based at least in part on whether the access point is in one or more of the lists. For example, where the access point is in the black list, the access point evaluator 1014 can attempt to locate another access point for providing wireless network access. Mobile device 1000 still further comprises a modulator 1016 and transmitter 1018 that respectively modulate and transmit signals to, for instance, a base station, another mobile device, etc. Although depicted as being separate from the processor 1006, it is to be appreciated that the interface 1010, list maintainer 1012, access point evaluator 1014, demodulator 1004, and/or modulator 1016 can be part of the processor 1006 or multiple processors (not shown).

Figure 11:
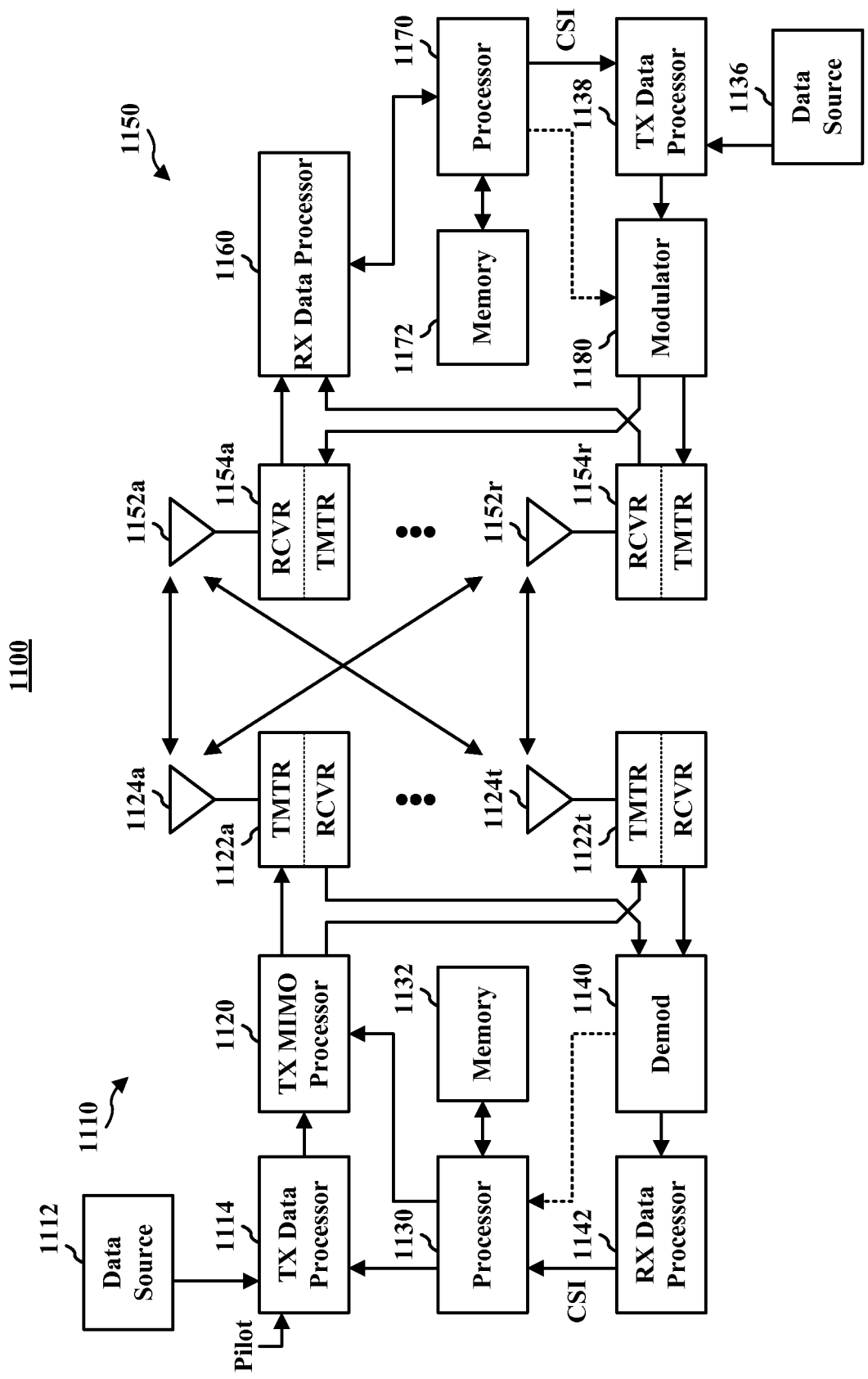
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-4 and 10), interfaces (FIG. 5) and/or methods (FIGS. 6-9) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122*a* through 1122*t*. In various aspects, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122*a* through 1122*t* are transmitted from $N_T$ antennas 1124*a* through 1124*t*, respectively.

At mobile device 1150, the transmitted modulated signals are received by $N_R$ antennas 1152*a* through 1152*r* and the received signal from each antenna 1152 is provided to a respective receiver (RCVR) 1154*a* through 1154*r*. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which preceding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154*a* through 1154*r*, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which preceding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
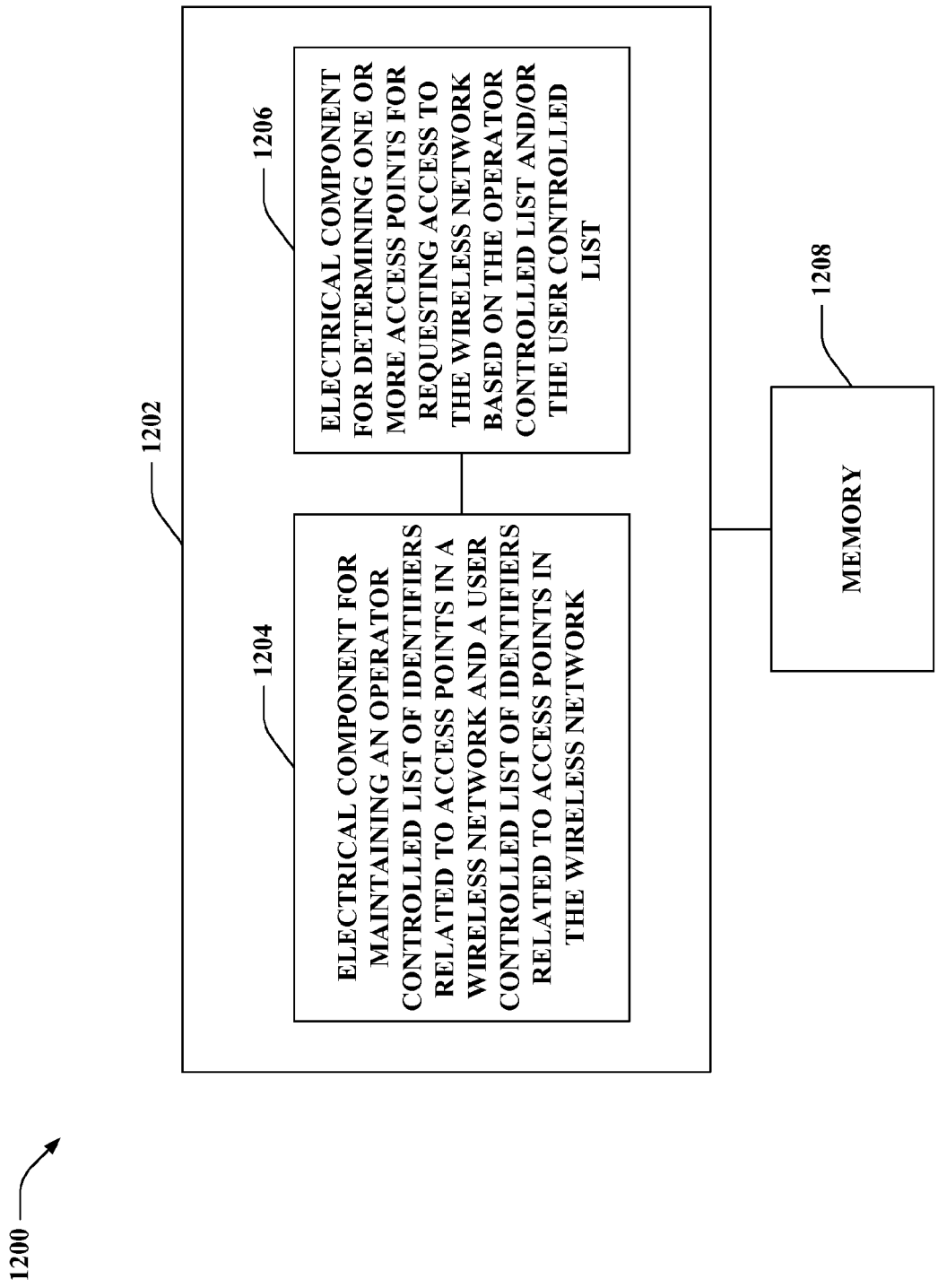
FIG. 12, is an illustration of an example system that maintains multiple access point lists.

With reference to FIG. 12, illustrated is a system 1200 that maintains multiple access point lists for subsequent utilization in selecting/reselecting access points for receiving access to a wireless network. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for maintaining an operator controlled list of identifiers related to access points in a wireless network and a user controlled list of identifiers related to access points in the wireless network 1204. For example, the operator controlled list can be managed based on commands received from the wireless network, and the user controlled list can be managed based at least in part on commands specified on a provided user interface, as described. Further, logical grouping 1202 can comprise an electrical component for determining one or more access points for requesting access to the wireless network based on the operator controlled and/or the user controlled list 1206. As described, the lists can relate to blacklists and/or whitelists, and access points can be selected if in the whitelist or ignored if in the blacklist. Additionally, system 1200 can include a memory 1208 that retains instructions for executing functions associated with electrical components 1204 and 1206. While shown as being external to memory 1208, it is to be understood that one or more of electrical components 1204 and 1206 can exist within memory 1208.

Figure 13:
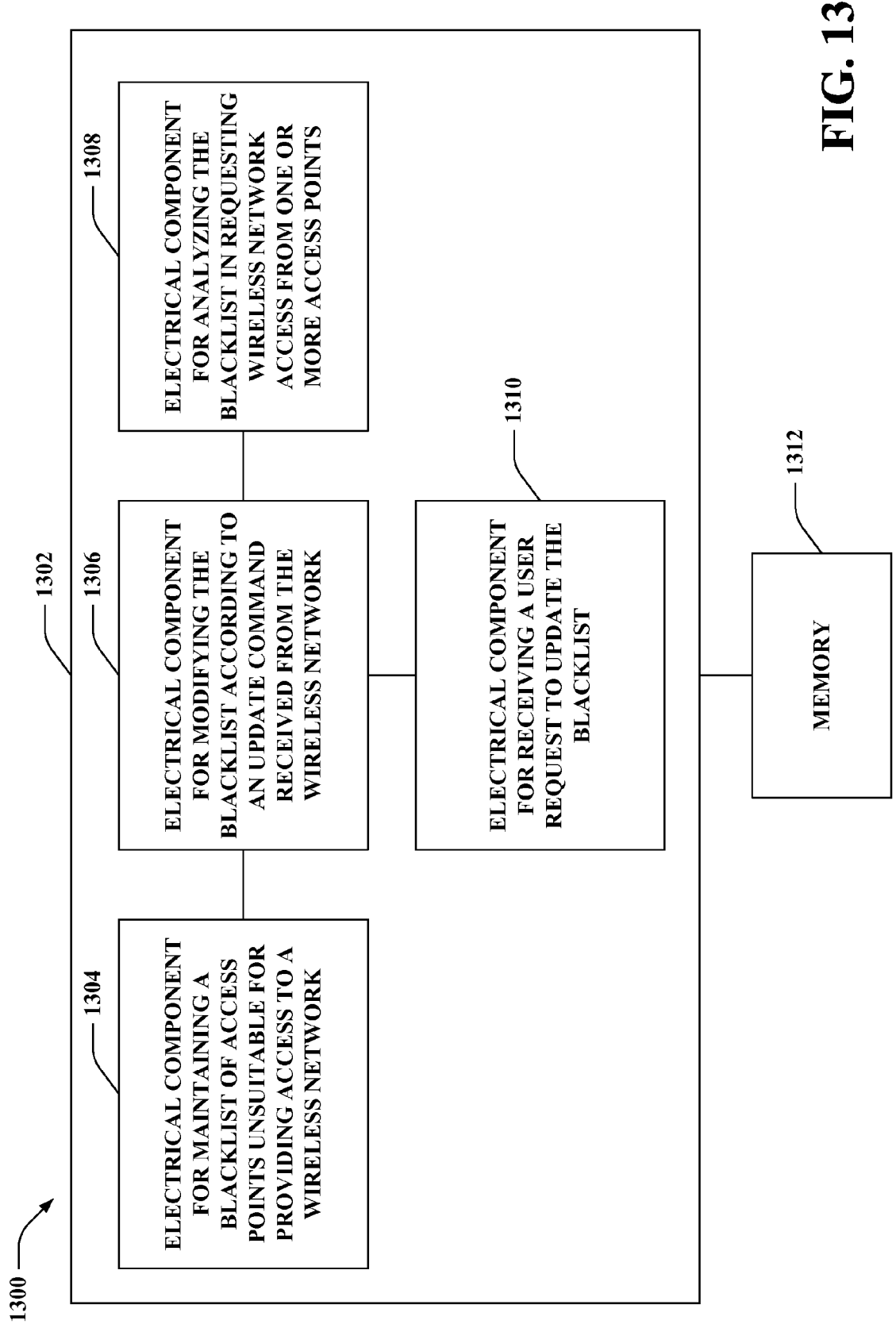
FIG. 13 is an illustration of an example system that facilitates maintaining a local blacklist based at least in part on received network commands.

With reference to FIG. 13, illustrated is a system 1300 that maintains a local blacklist through network provisioning for subsequent utilization in selecting/reselecting access points for receiving access to a wireless network. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for maintaining a blacklist of access points unsuitable for providing access to a wireless network 1304. For example, as described, the access points in the list can be identified using a base identifier, group identifier, communication parameter, etc. to allow granular specification of access points for which connection is not desired. Thus, in addition, the blacklist can be consulted in subsequent access point selection/reselection to determine whether one or more access points considered are in the blacklist. Further, logical grouping 1302 can comprise an electrical component for modifying the blacklist according to an update command received from the wireless network 1306.

As described, the blacklist can be updated and/or specified by the wireless network, and the system 1300 can keep a local copy for use in evaluating access points for subsequent communication establishment. Furthermore, logical grouping 1302 can include an electrical component for analyzing the blacklist in requesting wireless network access from one or more access points 1308. In addition, logical grouping 1302 can include an electrical component for receiving a user request to update the blacklist 1310. Thus, blacklist updates can be generated not only at the wireless network, but also on the system 1300 by user specification, for example. Additionally, system 1300 can include a memory 1312 that retains instructions for executing functions associated with electrical components 1304, 1306, 1308, and 1310. While shown as being external to memory 1312, it is to be understood that one or more of electrical components 1304, 1306, 1308, and 1310 can exist within memory 1312.

Figure 14:
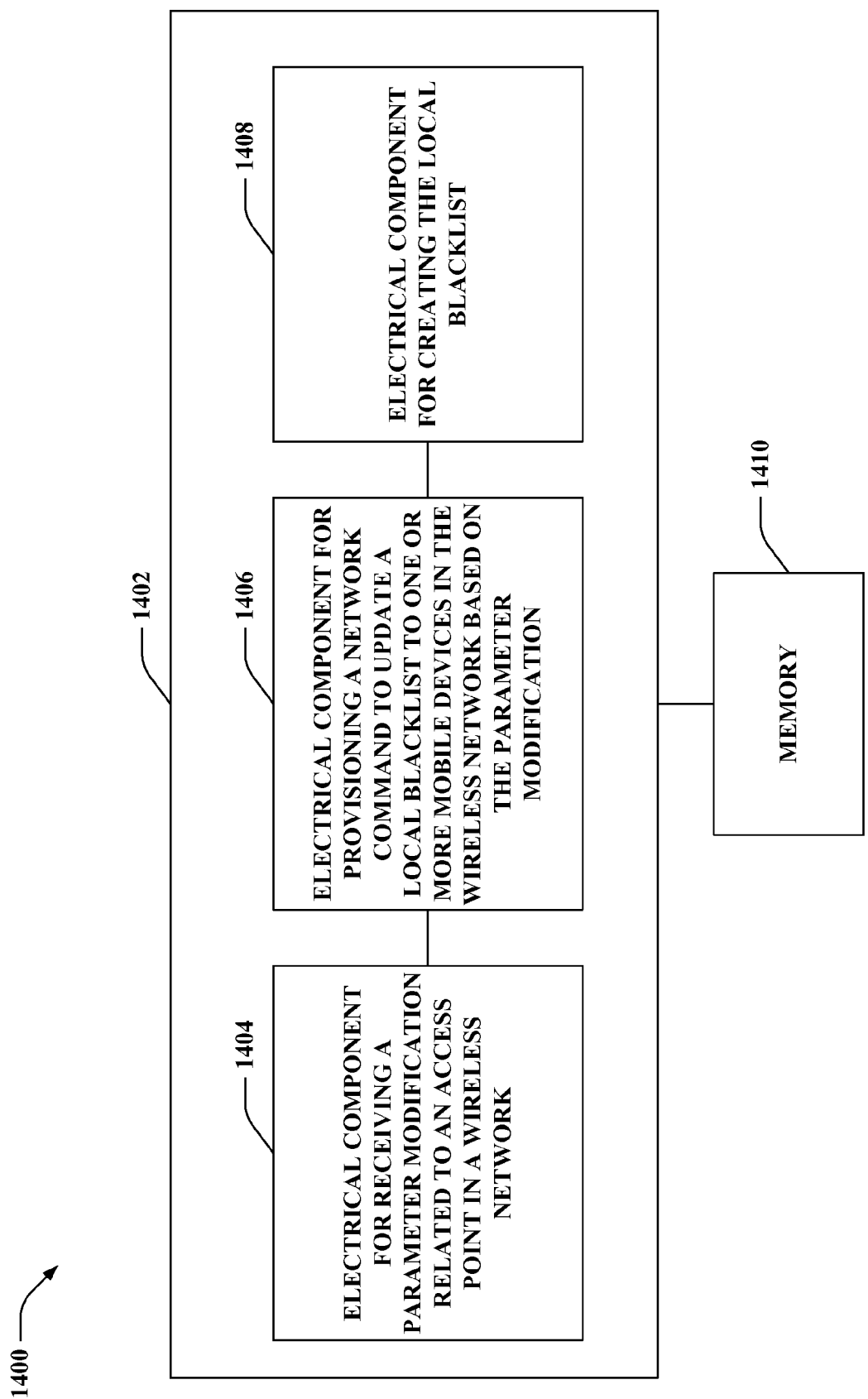
FIG. 14 is an illustration of an example system that facilitates providing network update commands for local blacklist management.

With reference to FIG. 14, illustrated is a system 1400 for provisioning blacklist updates to a mobile device over a wireless network. For example, system 1400 can reside at least partially within a wireless network component. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a parameter modification related to an access point in a wireless network 1404. The modification, for example, can correspond to authorization credentials of an access point, changes in support protocols, supported services, supported network providers, supported devices, and/or the like. Further, logical grouping 1402 can comprise an electrical component for provisioning a network command to update a local blacklist to one or more mobile devices in the wireless network based on the parameter modification 1406. Thus, the mobile devices that may have blacklisted that access point can be required to delete the access point from their blacklist to reattempt connection in view of the new parameters. Moreover, logical grouping 1402 can also comprise an electrical component for creating the local blacklist 1408. Thus, the blacklist can be created by the wireless network and can be based on the mobile device, a subscriber, a network provider, and/or the like. Furthermore, the electrical component 1406 can also provision the blacklist itself to the mobile devices. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
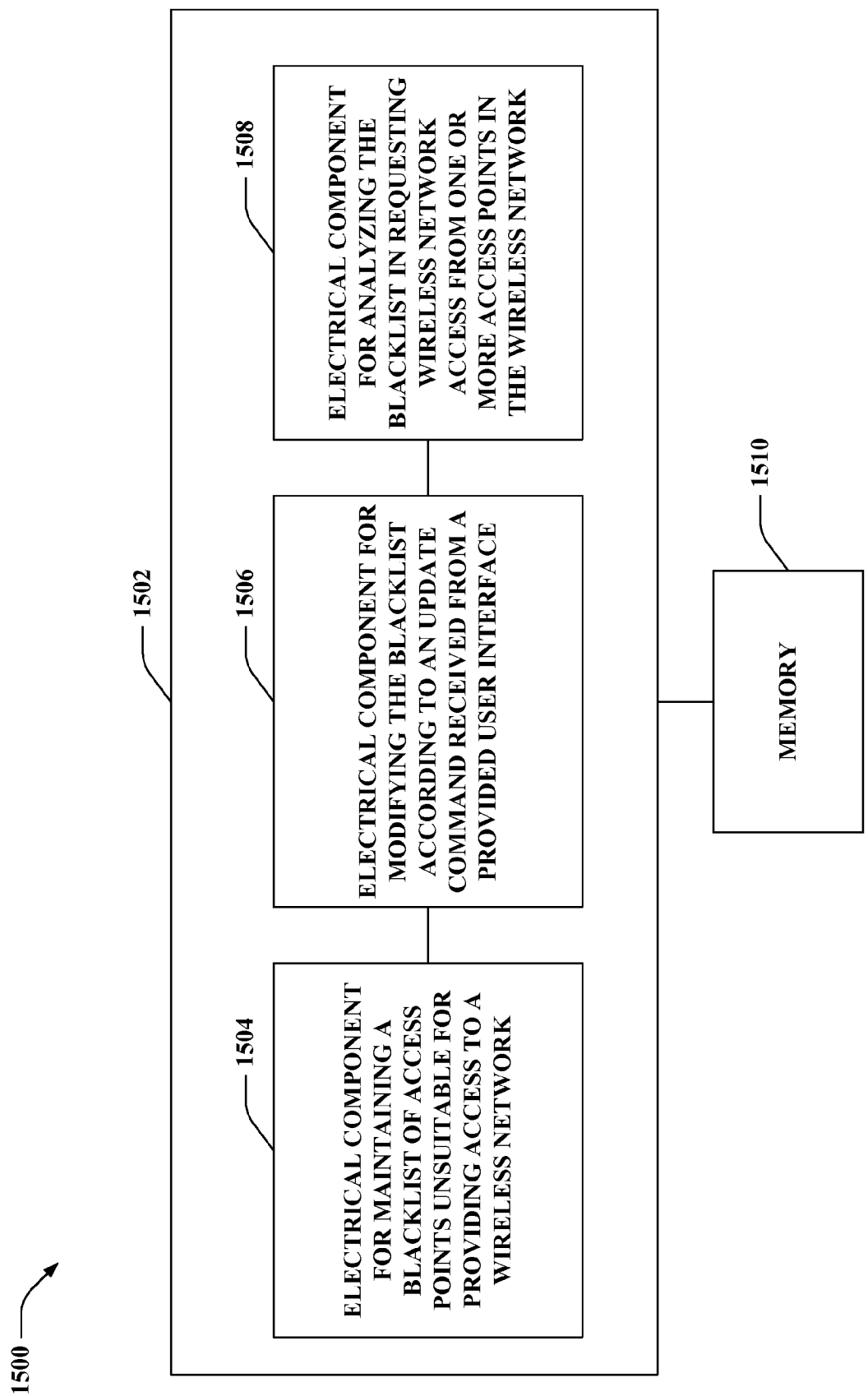
FIG. 15 is an illustration of an example system that updates a blacklist of access points according to user interface commands.

With reference to FIG. 15, illustrated is a system 1500 that updates a blacklist of access points according to user interface commands. For example, system 1500 can reside at least partially within a base station, mobile device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for maintaining a blacklist of access points unsuitable for providing access to a wireless network 1504. For example, as described, the access points in the list can be identified using a base identifier, group identifier, communication parameter, etc. to allow granular specification of access points for which connection is not desired. Thus, in addition, the blacklist can be consulted in subsequent access point selection/reselection to determine whether one or more access points considered are in the blacklist. Further, logical grouping 1502 can comprise an electrical component for modifying the blacklist according to an update command received from a provided user interface 1506.

As described, the blacklist can be updated according to user specification using a GUI. In this regard, for example, blacklist entries can be added, deleted, marked as permanent, etc. using the interface. Furthermore, logical grouping 1502 can include an electrical component for analyzing the blacklist in requesting wireless network access from one or more access points 1508. Additionally, system 1500 can include a memory 1510 that retains instructions for executing functions associated with electrical components 1504, 1506, and 1508. While shown as being external to memory 1510, it is to be understood that one or more of electrical components 1504, 1506, and 1508 can exist within memory 1510.

Figure 16:
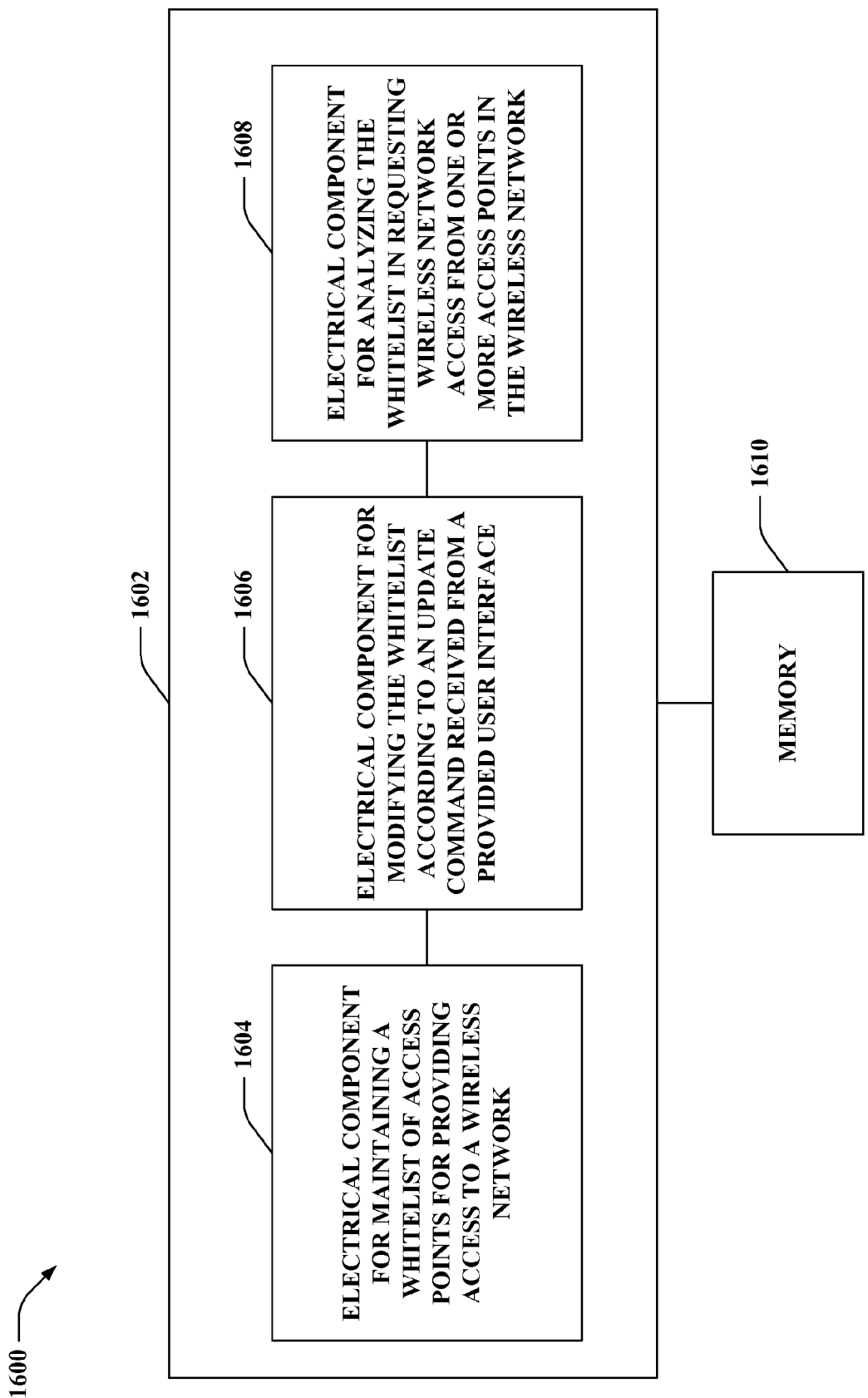
FIG. 16 is an illustration of an example system that receives whitelist updates from a provided user interface.

With reference to FIG. 16, illustrated is a system 1600 for receiving whitelist updates from a provided user interface. For example, system 1600 can reside at least partially within a wireless network component. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for maintaining a whitelist of access points for providing access to a wireless network 1604. For example, as described, the access points in the list can be identified using a base identifier, group identifier, communication parameter, etc. to allow granular specification of access points for which connection is desired. Thus, in addition, the whitelist can be consulted in subsequent access point selection/reselection to determine whether one or more access points considered are in the whitelist. Further, logical grouping 1602 can comprise an electrical component for modifying the whitelist according to an update command received from a provided user interface 1606.

As described, the whitelist can be updated according to user specification using a GUI. In this regard, for example, whitelist entries can be added, deleted, marked as permanent, etc. using the interface. Moreover, logical grouping 1602 can also comprise an electrical component for analyzing the whitelist in requesting wireless network access from one or more access points in the wireless network 1608. Additionally, system 1600 can include a memory 1610 that retains instructions for executing functions associated with electrical components 1604, 1606, and 1608. While shown as being external to memory 1610, it is to be understood that one or more of electrical components 1604, 1606, and 1608 can exist within memory 1610.

Figure 17:
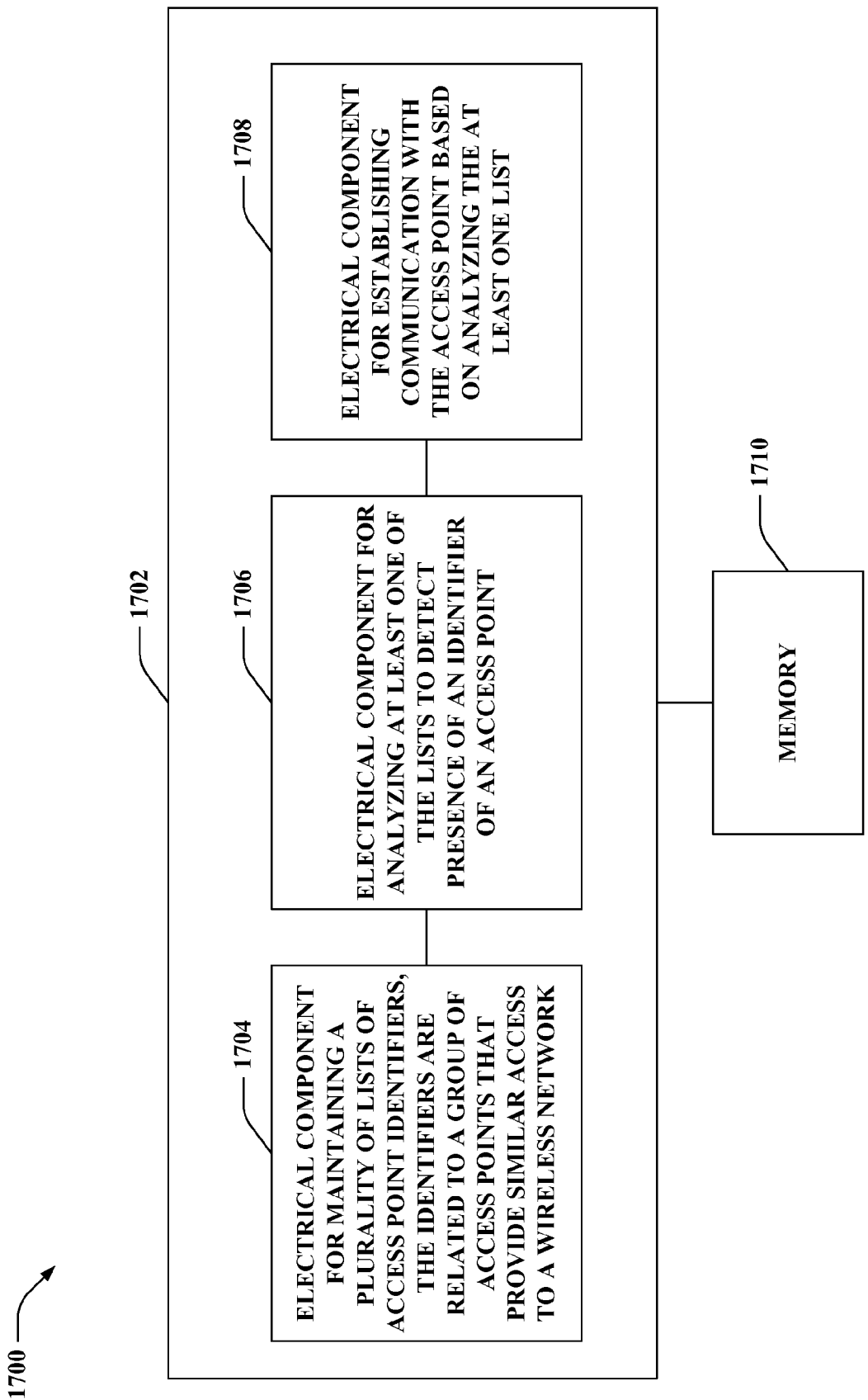
FIG. 17 is an illustration of an example system that maintains a plurality of lists of access points.

With reference to FIG. 17, illustrated is a system 1700 that maintains a plurality of lists of access points for utilization in requesting wireless network access. For example, system 1700 can reside at least partially within a base station, mobile device, etc. It is to be appreciated that system 1700 is represented as including functional blocks, which can be functional blocks that represent functions implemented by a processor, software, or combination thereof (e.g., firmware). System 1700 includes a logical grouping 1702 of electrical components that can act in conjunction. For instance, logical grouping 1702 can include an electrical component for maintaining a plurality of lists of access points identifiers, the identifiers are related to a group of access points that provide similar access to a wireless network 1704. For example, as described, the identifiers can be group identifiers where the access points in the group have a commonality, such as common service provider, brand, network type, supported protocols, services offered, price packaging, bandwidth, connection constraints, and/or the like. Further, logical grouping 1702 can comprise an electrical component for analyzing at least one of the lists to detect presence of an identifier of an access point 1706.

As described, the lists can relate to blacklists and/or whitelists. Thus, identifying an access point identifier in the list can indicate whether the access point should be ignored or considered during cell selection/reselection, as described. Furthermore, logical grouping 1702 can include an electrical component for establishing communication with the access point based on analyzing the at least one list 1708. Additionally, system 1700 can include a memory 1710 that retains instructions for executing functions associated with electrical components 1704, 1706, and 1708. While shown as being external to memory 1710, it is to be understood that one or more of electrical components 1704, 1706, and 1708 can exist within memory 1710.

Figure 18:
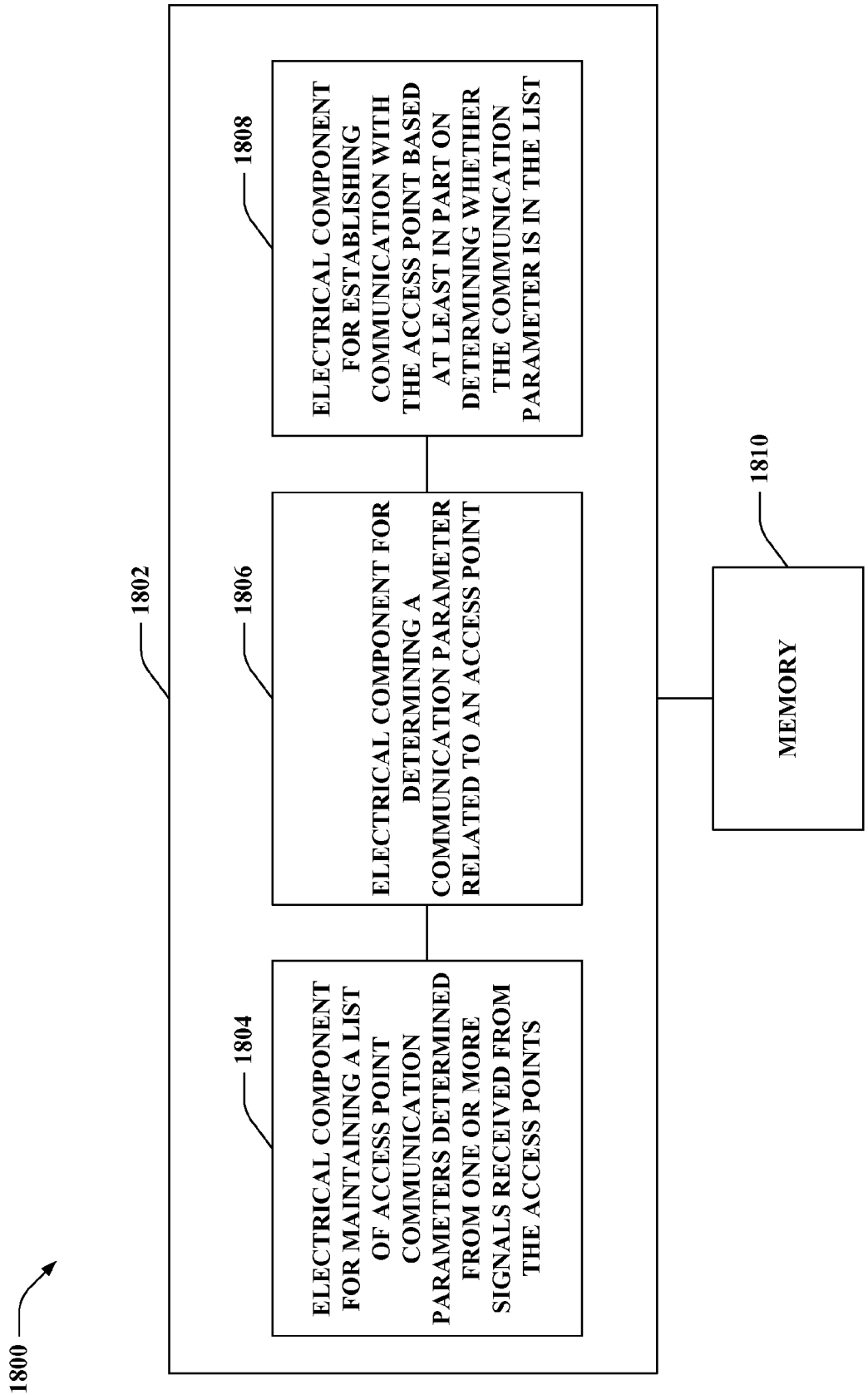
FIG. 18 is an illustration of an example system that facilitates maintaining a list of access points using communication parameters associated therewith.

With reference to FIG. 18, illustrated is a system 1800 that facilitates maintaining a list of access points using communication parameters associated therewith. For example, system 1800 can reside at least partially within a wireless network component. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component for maintaining a list of access point communication parameters determined from one or more signals received from the access points 1804. For example, as described, the access points in the list can be identified using the associated communication parameters, such as PN offset, bandclass, radio channels, and/or the like. Further, logical grouping 1802 can comprise an electrical component for determining a communication parameter related to an access point 1806. This can be similarly determined from a signal transmitted by the access point. Moreover, logical grouping 1802 can also comprise an electrical component for establishing communication with the access point based at least in part on determining whether the communication parameter is in the list 1808. As described, the list can relate to a blacklist and/or whitelist, and communication can be accordingly established if the communication parameter is in the whitelist, or not established if in the blacklist. Additionally, system 1800 can include a memory 1810 that retains instructions for executing functions associated with electrical components 1804, 1806, and 1808. While shown as being external to memory 1810, it is to be understood that one or more of electrical components 1804, 1806, and 1808 can exist within memory 1810.

Figure 19:
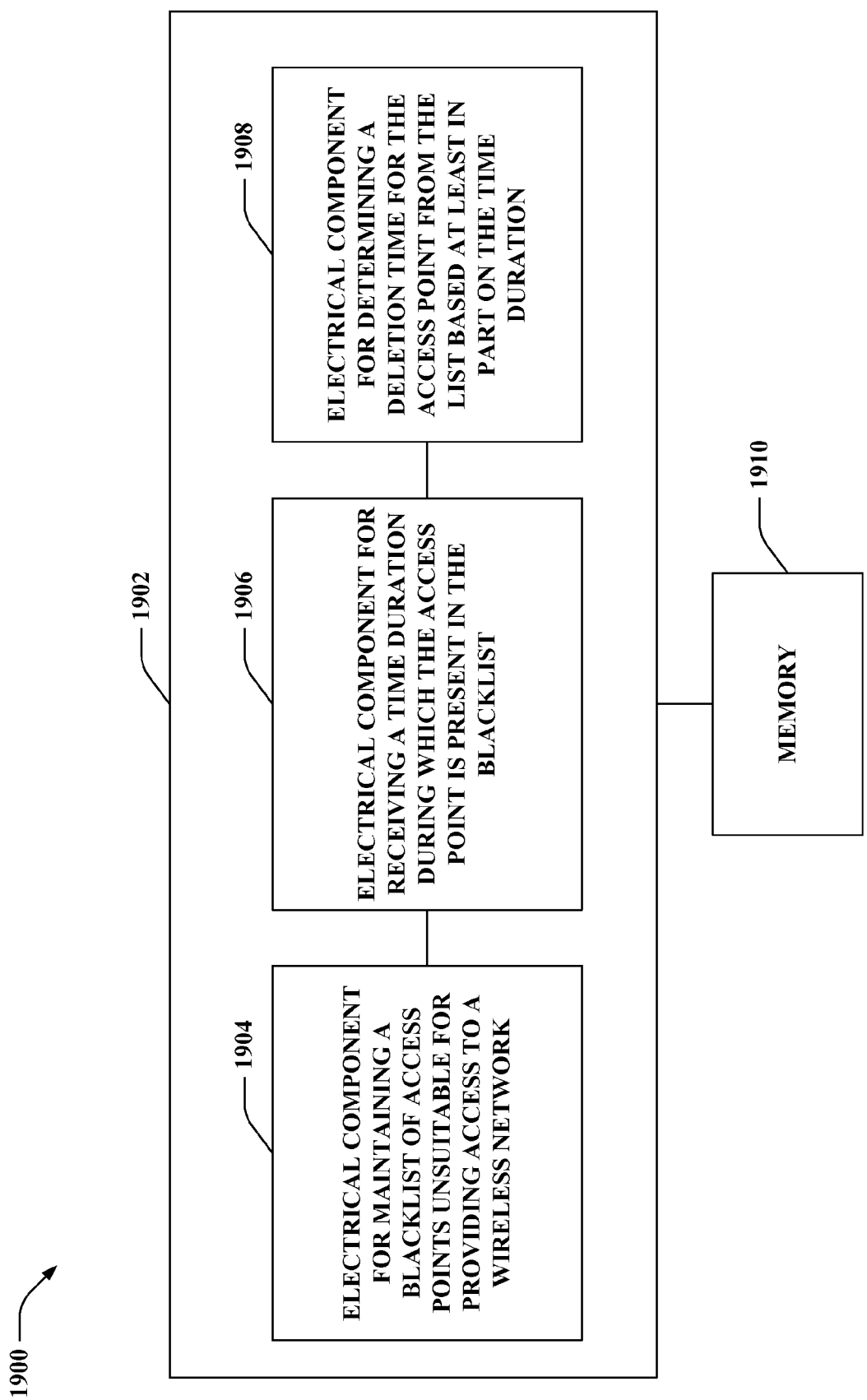
FIG. 19 is an illustration of an example system that manages access point lists based on timers.

With reference to FIG. 19, illustrated is a system 1900 for managing access point lists based on timers. For example, system 1900 can reside at least partially within a wireless network component. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for maintaining a blacklist of access points unsuitable for providing access to a wireless network 1904. For example, as described, the access points in the list can be identified using a base identifier, group identifier, communication parameter, etc. to allow granular specification of access points to which connection is not desired. Thus, in addition, the blacklist can be consulted in subsequent access point selection/reselection to determine whether one or more access points considered are in the blacklist. Further, logical grouping 1902 can comprise an electrical component for receiving a time duration during which the access point is present in the blacklist 1906.

As described, time duration can be determined from a timer initialized upon entry of the access point in the blacklist. Moreover, logical grouping 1902 can also comprise an electrical component for determining a deletion time for the access point from the list based at least in part on the time duration 1908. Thus, for example, a deletion threshold can be compared to the time duration to determine when to delete the access point from the list, as described. Additionally, system 1900 can include a memory 1910 that retains instructions for executing functions associated with electrical components 1904, 1906, and 1908. While shown as being external to memory 1910, it is to be understood that one or more of electrical components 1904, 1906, and 1908 can exist within memory 1910.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   maintaining an operator controlled list of identifiers related to access points in a wireless network by a processor;
   maintaining a user controlled list of identifiers related to access points in the wireless network by the processor;
   utilizing at least one of the operator controlled list or the user controlled list to select one or more access points for requesting access to the wireless network; and
   modifying the user controlled list of identifiers based at least in part on a command received from a provided user interface.

2. The method of claim 1, wherein the operator controlled list comprises blacklisted identifiers related to access points unsuitable for providing access to the wireless network.

3. The method of claim 1, wherein the user controlled list comprises blacklisted identifiers related to access points unsuitable for providing access to the wireless network.

4. A method, comprising:
   maintaining an operator controlled list of identifiers related to access points in a wireless network by a processor;
   maintaining a user controlled list of identifiers related to access points in the wireless network by the processor;
   utilizing at least one of the operator controlled list or the user controlled list to select one or more access points for requesting access to the wireless network; and
   modifying the operator controlled list of identifiers based at least in part on a command received from the wireless network.

5. A wireless communications apparatus, comprising:
   at least one processor;
   a non-transitory computer-readable medium coupled to the processor storing codes that when executed by the processor cause to the apparatus to:
      maintain an operator controlled list of identifiers related to access points in a wireless network;
      maintain a user controlled list of identifiers related to access points in the wireless network;
      select one or more access points for requesting access to the wireless network based on at least one of the operator controlled list or the user controlled list; and
      modify the user controlled list of identifiers based at least in part on a command received from a provided user interface.

6. The wireless communications apparatus of claim 5, wherein the operator controlled list comprises blacklisted identifiers related to access points unsuitable for providing access to the wireless network.

7. An apparatus, comprising:
   means for maintaining an operator controlled list of identifiers related to access points in a wireless network and a user controlled list of identifiers related to access points in the wireless network;
   means for selecting one or more access points for requesting access to the wireless network based on at least one of the operator controlled list or the user controlled list; and
   means for modifying the user controlled list of identifiers based at least in part on a command received from a provided user interface.

8. The apparatus of claim 7, wherein the operator controlled list comprises blacklisted identifiers related to access points unsuitable for providing access to the wireless network.

9. A non-transitory computer-readable medium comprising:
   code for causing at least one computer to maintain an operator controlled list of identifiers related to access points in a wireless network;
   code for causing the at least one computer to maintain a user controlled list of identifiers related to access points in the wireless network;
   code for causing the at least one computer to utilize at least one of the operator controlled list or the user controlled to select one or more access points for requesting access to the wireless network; and
   code for causing the at least one computer to modify the user controlled list of identifiers based at least in part on a command received from a provided user interface.

10. The non-transitory computer-readable medium of claim 9, wherein the operator controlled list comprises blacklisted identifiers related to access points unsuitable for providing access to the wireless network.

11. An apparatus, comprising:
    an interface that processes one or more commands presented on the interface to update a user controlled list;
    at least one processor;
    a non-transitory computer-readable medium coupled to the processor storing codes that when executed by the processor cause the apparatus to:
       manage an operator controlled list of identifiers related to access points in a wireless network and a user controlled list of identifiers related to access points in the wireless network; and
       Utilize at least one of the operator controlled list or the user controlled list in selecting an access point from which to request access to the wireless network.

12. An apparatus, comprising:
    at least one processor;
    a non-transitory computer-readable medium coupled to the processor storing codes that when executed by the processor cause the apparatus to:
       manage an operator controlled list of identifiers related to access points in a wireless network and a user controlled list of identifiers related to access points in the wireless network; and
       Utilize at least one of the operator controlled list or the user controlled list in selecting an access point from which to request access to the wireless network; and
       process one or more commands, received from the wireless networks, to update the operator controlled list.

13. The apparatus of claim 11, wherein the operator controlled list comprises blacklisted identifiers related to access points unsuitable for providing access to the wireless network.

14. The apparatus of claim 11, wherein the user controlled list comprises blacklisted identifiers related to access points unsuitable for providing access to the wireless network.

15. A method for identifying cells from which to request wireless network access, comprising:

maintaining a user controlled list of identifiers related to access points for providing access to a wireless network;

modifying the user controlled list according to a command received from the wireless network; and utilizing the user controlled list in determining one or more access points for requesting access to the wireless network.

16. The method of claim 15, wherein the command relates to an update in at least one operating parameter for an access point and modifying the user controlled list includes removing an identifier related to the access point from the user controlled list, wherein the at least one operating parameter comprises at least one of signal quality, connection throughput, services offered or a service provider related to an access point.

17. The method of claim 16, further comprising adding the identifier of the access point to a blacklist of identifiers related to suitable access points unsuitable for providing access to the wireless network.

18. The method of claim 17, wherein the blacklist and user controlled list correspond to a single list of access points each entry in the single list having a blacklist or whitelist identifier.

19. The method of claim 15, wherein the user controlled list is stored in a preferred user zone list (PUZL) database.

20. The method of claim 15, wherein the command comprises a request to flush a blacklist of identifiers related to access points unsuitable for providing access to the wireless network and the method further comprises:

removing all entries from the blacklist.

21. The method of claim 15, further comprising receiving the command from the wireless network as a short message service (SMS) message.

22. The method of claim 15, further comprising initially receiving the user controlled list from the wireless network.

23. The method of claim 22, further comprising maintaining a local blacklist of unsuitable access point identifiers.

24. The method of claim 23, further comprising updating the local blacklist based at least in part on commands received from a provided interface.

25. The method of claim 23, wherein determining one or more access points for requesting access to the wireless network includes:

discovering an in-range access point that advertises an identifier; and scanning for one or more different access points upon determining that the identifier is in the blacklist.

26. A wireless communications apparatus, comprising:

at least one processor;

a non-transitory storage medium coupled to the processor storing codes that when executed by the processor cause to the apparatus to:

maintain a user controlled list of identifiers related to access points for providing wireless network access to the wireless communications apparatus;

update at least one user controlled list access point entry based at least in part on a network command related to a determined modification in at least one operating parameter for the user controlled list access point entry; and request network access to an access point based at least in part on verifying presence of the access point in the, user controlled list.

27. The wireless communications apparatus of claim 26, wherein the network command relates to an update in operating parameters for an access point and updating the at least one user controlled list access point entry includes removing an identifier related to the access point from the user controlled list.

28. An apparatus, comprising:

means for maintaining a user controlled list of identifiers related to access points for providing access to a wireless network;

means for modifying the user controlled list according to an update command received from the wireless network; and means for utilizing the user controlled list in determining one or more access points for requesting wireless network access.

29. The apparatus of claim 28, wherein the update command relates to an update in operating parameters for an access point and the means for modifying the user controlled list removes an identifier related to the access point from the user controlled list.

30. A non-transitory computer-readable medium comprising:

code for causing at least one computer to maintain a user controlled list of identifiers related to access points for providing access to a wireless network;

code for causing the at least one computer to modify the user controlled list according to a command received from the wireless network; and code for causing the at least one computer to utilize the user controlled list in determining one or more access points for requesting access to the wireless networks.

31. The non-transitory computer-readable medium of claim 30, wherein the command relates to an update in operating parameters for an access point and modifying the user controlled list includes removing an identifier related to the access point from the user controlled list, wherein the operating parameters comprise at least one of signal quality, connection throughput, services offered or a service provider related to an access point.

32. An apparatus, comprising:

at least one processor;

a non-transitory computer-readable medium coupled to the processor storing codes that when executing by the processor cause the apparatus to:

maintain a user controlled list of identifiers related to access points for providing access to a wireless network;

process one or more commands, received from the wireless network, to update the user controlled list; and utilize the user controlled list in selecting an access point from which to request access to the wireless networks.

33. The apparatus of claim 32, wherein the one or more commands comprise a command specifying removal of an entry in the user controlled list and the processor causes the apparatus to remove the entry from the user controlled list.

34. The apparatus of claim 33, wherein the processor further causes the apparatus to add the entry to a blacklist of access points unsuitable for providing access to the wireless network.

35. The apparatus of claim 34, wherein the blacklist and user controlled list correspond to a single list of access points each entry in the single list having a blacklist or whitelist identifier.

36. The apparatus of claim 32, wherein the user controlled list is stored in a preferred user zone list (PUZL) database.

37. The apparatus of claim 32, wherein the one or more commands comprise a command specifying an update in at least one operating parameter of an entry in the user controlled list and the processor causes the apparatus remove the entry from the user controlled list based on the command.

38. A method for identifying cells from which to request wireless network access, comprising:
maintaining a user controlled list of identifiers related to access points for providing access to a wireless network based at least in part on one or more commands received from a provided user interface;
updating the user controlled list based on an update in at least one operating parameter for an access point;
detecting an access point that provides access to the wireless network; and
scanning for one or more disparate access points based at least in part on determining an identifier of the access point is not included in the user controlled list.

39. The method of claim 38, further comprising adding an identifier of the access point to the user controlled list based at least in part on processing a request for addition received from the user interface.

40. The method of claim 39, further comprising displaying a prompt on the user interface related to adding the identifier of the access point to the user controlled list upon detecting the access point.

41. The method of claim 39, further comprising removing the identifier of the access point from a blacklist based at least in part on processing a request for deletion received from the user interface.

42. The method of claim 41, wherein the request for deletion received from the user interface is a request to flush the blacklist.

43. The method of claim 39, wherein adding the identifier of the access point to the user controlled list includes specifying the identifier as a permanent entry such that deletion by a command from the wireless network is prohibited.

44. The method of claim 38, further comprising storing the user controlled list on a removable memory device.

45. A wireless communications apparatus, comprising:
at least one processor;
a non-transitory storage medium coupled to the processor storing codes that when executed by the processor cause the apparatus to:
maintain a user controlled list of identifiers related to access points for providing wireless network access to the wireless communications apparatus based at least in part on one or more requests received from a provided user interface;
update the user controlled list based on an update in at least one operating parameter for an access point;
detect an access point that provides access to the wireless network; and
scan for one or more disparate access points based at least in part on determining an identifier of the access point is not included in the, user controlled list.

46. The wireless communications apparatus of claim 45, wherein the at least one processor is further configured to add an identifier of the access point to the user controlled list based at least in part on processing a request for addition received from the provided user interface.

47. An apparatus, comprising:
means for maintaining a user controlled list of identifiers related to access points for providing access to a wireless network;
means for modifying the user controlled list based on an update in at least one operating parameter for an access point and according to an update command received from a provided user interface;
means for detecting an access point that provides access to the wireless network; and
means for analyzing the user controlled list in requesting wireless network access from one or more access points in the wireless network, further comprising scanning for one or more disparate access points based at least in part on determining an identifier of the access point is not included in the user controlled list.

48. The apparatus of claim 47, wherein the means for modifying the user controlled list adds an identifier of the one or more access points to the user controlled list based at least in part on processing a request for addition received from the provided user interface.

49. A non-transitory computer-readable medium comprising:
code for causing at least one computer to maintain a user controlled list of identifiers related to access points for providing access to a wireless network based at least in part on one or more commands received from a provided user interface;
code for causing the user controlled list to be updated based on an update in at least one operating parameter for an access point;
code for causing the at least one computer to detect an access point that provides access to the wireless network; and
code for causing the at least one computer to scan for one or more disparate access points based at least in part on determining an identifier of the access point is not included in the user controlled list.

50. The non-transitory computer-readable medium of claim 49, further comprising code for causing the at least one computer to add an identifier of the access point to the user controlled list based at least in part on processing a request for addition received from the user interface.

51. An apparatus, comprising:
an interface that receives one or more commands to update a user controlled list of identifiers related to access points for providing access to a wireless network;
at least one processor;
a non-transitory computer-readable medium coupled to the interface storing codes that when executed by the processor cause the apparatus to:
manage the user controlled list based at least in part on the one or more commands and based on an update in at least one operating parameter for an access point; and
utilize the user controlled list in selecting an access point from which to request access to the wireless network based at least in part on determining an identifier of the access point is not included in the user controlled list.

52. The apparatus of claim 51, wherein the interface receives a command to add an access point to the user controlled list and the processor causes the apparatus to add the access point to the user controlled list.

53. The apparatus of claim 52, wherein the processor causes the apparatus to ignore an unsuitable access point in selecting an access point based at least in part on determining an identifier of the unsuitable access point is not included in the user controlled list.

54. The apparatus of claim 52, wherein the interface further receives a command to remove the access point from the user controlled list and the processor causes the apparatus to remove the access point from the user controlled list.

55. The apparatus of claim 51, wherein the interface displays a prompt to add an access point to the user controlled list based at least in part on the processor encountering the access point.

56. A method for identifying cells from which to request wireless network access, comprising:
maintaining a plurality of user controlled lists of access point identifiers and updating at least one user controlled list based on an update in operating parameters for a group of access points, which provide similar access to a wireless network;
detecting an access point that advertises an identifier present in at least one of the user controlled lists; and
determining whether to establish a connection with the access point based at least in part on presence of the identifier in the at least one user controlled list.

57. The method of claim 56, wherein the at least one user controlled list is a blacklist of access point identifiers indicating access points unsuitable for providing access to the wireless network.

58. The method of claim 56, wherein the at least one user controlled list is a whitelist of access point identifiers indicating access points for providing access to the wireless network.

59. The method of claim 56, further comprising modifying the at least one user controlled list based at least in part on one or more commands received from a provided user interface.

60. The method of claim 56, further comprising modifying the at least one user controlled list based at least in part on one or more commands received from the wireless network.

61. The method of claim 56, further comprising modifying the at least one user controlled list based at least in part on one or more detected events.

62. The method of claim 61, wherein the one or more detected events comprises one or more successful or failed connection establishment requests to the access point.

63. A wireless communications apparatus, comprising:
at least one processor;
a non-transitory storage medium coupled to the processor storing codes that when executed by the processor cause the apparatus to:
maintain and update a plurality of user controlled lists of access point identifiers based on updates in operating parameters of the access points, wherein the identifiers are related to a group of access points that provide similar access to a wireless network;
detect an access point that provides access to the wireless network and advertises an identifier present in at least one of the user controlled lists; and
determine whether to establish communication with the access point based on presence of the identifier in the at least one list and a type of the at least one list.

64. The wireless communications apparatus of claim 63, wherein the at least one user controlled list is a blacklist of access point identifiers indicating access points unsuitable for providing access to the wireless network.

65. An apparatus, comprising:
means for maintaining and updating a plurality of user controlled lists of access point identifiers based on updates in operating parameters of the access points, wherein the identifiers are related to a group of access points that provide similar access to a wireless network;
means for analyzing at least one of the user controlled lists to detect presence of an identifier of an access point; and
means for establishing communication with the access point based on analyzing the at least one user controlled list.

66. The apparatus of claim 65, wherein the at least one user controlled list is a blacklist of access point identifiers indicating access points unsuitable for providing access to the wireless network.

67. A non-transitory computer-readable medium comprising:
code for causing at least one computer to maintain and update a plurality of user controlled lists of access point identifiers based on updates in operating parameters of a group of access points, which provide similar access to a wireless network;
code for causing the at least one computer to detect an access point that advertises an identifier present in at least one of the user controlled lists; and
code for causing the at least one computer to determine whether to establish a connection with the access point based at least in part on presence of the identifier in the at least one user controlled list.

68. The non-transitory computer-readable medium of claim 67, wherein the at least one user controlled list is a blacklist of access point identifiers indicating access points unsuitable for providing access to the wireless network.

69. An apparatus, comprising:
at least one processor;
a non-transitory computer-readable medium coupled to the processor storing codes that when executed by the processor cause the apparatus to:
maintain and update a plurality of user controlled lists of access point identifiers based on updates in operating parameters of the access points, the identifiers correspond to groups of access points that provide similar access to a wireless network; and
detect an access point that advertises an identifier and establish communication with the access point based at least in part on analyzing at least one of the user controlled lists to determine whether the identifier is present.

70. The apparatus of claim 69, wherein the at least one user controlled list is a blacklist of access point identifiers indicating access points unsuitable for providing access to the wireless network.

71. The apparatus of claim 69, wherein the at least one user controlled list is a whitelist of access point identifiers indicating access points for providing access to the wireless network.

72. The apparatus of claim 69, further comprising a user interface wherein the processor further causes the apparatus to modify at least one of the user controlled lists based at least in part on one or more commands received from the user interface.

73. A method for identifying cells from which to request wireless network access, comprising:
maintaining one or more lists of at least one access point communication parameter computed from signals received from the respective access points, wherein the at least one communication parameter comprises a signal quality, connection throughput, services offered or a service provider related to the access point;
computing an access point communication parameter from a signal received from the access point; and
determining whether to establish a connection with the access point based at least in part on presence of the at least one computed communication parameter in the at least one list.

74. The method of claim 73, wherein the at least one list is a blacklist of access point communication parameters corresponding to access points unsuitable for providing access to a wireless network.

75. The method of claim 73, wherein the at least one list is a whitelist of access point communication parameters corresponding to access points for providing access to a wireless network.

76. The method of claim 73, further comprising modifying the at least one list based at least in part on one or more commands received from a provided user interface.

77. The method of claim 73, further comprising modifying the at least one list based at least in part on one or more commands received from a wireless network.

78. The method of claim 73, further comprising modifying the at least one list based at least in part on one or more detected events.

79. The method of claim 78, wherein the one or more detected events comprises one or more successful or failed connection establishment requests to the access point.

80. A wireless communications apparatus, comprising:
at least one processor;
a non-transitory storage medium coupled to the processor storing codes that when executed by the processor cause the apparatus to:
maintain a list of at least one access point communication parameter computed from one or more signals received from the respective access points, wherein the at least one access point communication parameter comprises at least one of a signal quality, connection throughput, services offered or a service provider related to the access point;
determine a communication parameter related to an access point; and
determine whether to establish communication with the access point based on presence of the communication parameter in the list.

81. The wireless communications apparatus of claim 80, wherein the list is a blacklist of access point communication parameters corresponding to access points unsuitable for providing access to a wireless network.

82. An apparatus, comprising:
means for maintaining a list of at least one access point communication parameter determined from one or more signals received from the respective access points, wherein the at least one access point communication parameter comprises at least one of a signal quality, connection throughput, services offered or a service provider related to the access point;
means for determining a communication parameter related to an access point; and
means for establishing communication with the access point based at least in part on determining whether the communication parameter is in the list.

83. The apparatus of claim 82, wherein the list is a blacklist of access point communication parameters corresponding to access points unsuitable for providing access to a wireless network.

84. A non-transitory computer-readable medium comprising:
code for causing at least one computer to maintain one or more lists of at least one access point communication parameter computed from signals received from the respective access points wherein the at least one access point communication parameter comprises at least one of a signal quality, connection throughput, services offered or a service provider related to the access point;
code for causing the at least one computer to compute an access point communication parameter from a signal received from the access point; and
code for causing the at least one computer to determine whether to establish a connection with the access point based at least in part on presence of the computed communication parameter in the at least one list.

85. The non-transitory computer-readable medium of claim 84, wherein the at least one list is a blacklist of access point communication parameters corresponding to access points unsuitable for providing access to a wireless network.

86. An apparatus, comprising:
at least one processor;
a non-transitory computer-readable medium coupled to the processor storing codes that when executed by the processor cause the apparatus to:
maintain a list of at least one access point communication parameter calculated from one or more signals received from related access points, wherein the at least one access point communication parameter comprises at least one of a signal quality, connection throughput, services offered or a service provider related to the access point; and
determine an access point communication parameter and establish communication with the access point based at least in part on analyzing the list to determine whether the communication parameter is present.

87. The apparatus of claim 86, wherein the list is a blacklist of access point communication parameters corresponding to access points unsuitable for providing access to a wireless network.

88. The apparatus of claim 86, wherein the list is a whitelist of access point communication parameters corresponding to access points for providing access to a wireless network.

89. The apparatus of claim 86, further comprising a user interface wherein the processor further causes the apparatus to modify the list based at least in part on one or more commands received from the user interface.

* * * * *